United States Patent
Yamaguchi

(10) Patent No.: US 12,341,452 B2
(45) Date of Patent: Jun. 24, 2025

(54) CONTROL APPARATUS FOR ROTATING ELECTRIC MACHINE

(71) Applicant: DENSO CORPORATION, Kariya (JP)

(72) Inventor: Miho Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 159 days.

(21) Appl. No.: 18/224,170

(22) Filed: Jul. 20, 2023

(65) Prior Publication Data

US 2023/0361705 A1    Nov. 9, 2023

Related U.S. Application Data

(63) Continuation of application No. PCT/JP2021/047889, filed on Dec. 23, 2021.

(30) Foreign Application Priority Data

Jan. 22, 2021    (JP) .................. 2021-008624

(51) Int. Cl.
*H02P 21/36*    (2016.01)
*H02P 9/12*    (2006.01)
(Continued)

(52) U.S. Cl.
CPC ............. *H02P 21/36* (2016.02); *H02P 9/123* (2013.01); *H02P 21/16* (2016.02); *H02P 21/22* (2016.02)

(58) Field of Classification Search
CPC ............ H02P 3/22; H02P 29/024; H02P 3/12; H02P 21/36; H02P 21/0089; H02P 23/20;
(Continued)

(56) References Cited

U.S. PATENT DOCUMENTS

| | | | |
|---|---|---|---|
| 2014/0062362 A1* | 3/2014 | Kawai | H02P 29/662 318/400.22 |
| 2017/0237381 A1* | 8/2017 | Shinohara | H02P 29/027 318/400.27 |

(Continued)

FOREIGN PATENT DOCUMENTS

| | | |
|---|---|---|
| JP | 2019-062589 A | 4/2019 |
| JP | 2019-106866 A | 6/2019 |

*Primary Examiner* — Bickey Dhakal
(74) *Attorney, Agent, or Firm* — Oliff PLC

(57) ABSTRACT

A control apparatus is applied to a system that includes a rotating electric machine and an inverter. The inverter has, for each of a plurality of phases, upper-arm and lower-arm switches each of which has a diode connected in antiparallel thereto. The control apparatus includes an all-phase short-circuiting unit and a single-phase short-circuiting unit. The all-phase short-circuiting unit performs all-phase short-circuit control of turning on, for example, all the upper-arm switches of the plurality of phases while turning off all the lower-arm switches of the plurality of phases. The single-phase short-circuiting unit performs, in a regenerative drive state of the rotating electric machine and prior to execution of the all-phase short-circuit control, single-phase short-circuit control of turning on one of the upper-arm and lower-arm switches of one of the plurality of phases, turning off the other switch of the phase and turning off all the switches of the remaining phases.

12 Claims, 14 Drawing Sheets

(51) Int. Cl.
*H02P 21/16* (2016.01)
*H02P 21/22* (2016.01)

(58) Field of Classification Search
CPC .......... H02P 9/12; H02P 9/123; H02M 1/327; H02M 7/48; B62D 5/046; H02H 7/122; H01J 2229/0053
See application file for complete search history.

(56) References Cited

U.S. PATENT DOCUMENTS

| | | |
|---|---|---|
| 2020/0161939 A1 | 5/2020 | Takahashi et al. |
| 2020/0162003 A1 | 5/2020 | Takahashi et al. |
| 2020/0328639 A1 | 10/2020 | Takahashi |
| 2020/0336033 A1 | 10/2020 | Takahashi |
| 2022/0006356 A1 | 1/2022 | Takahashi et al. |
| 2022/0006357 A1 | 1/2022 | Takahashi et al. |
| 2022/0006358 A1 | 1/2022 | Takahashi et al. |
| 2022/0014074 A1 | 1/2022 | Takahashi et al. |
| 2022/0014075 A1 | 1/2022 | Takahashi et al. |
| 2022/0045578 A1 | 2/2022 | Takahashi et al. |
| 2023/0134487 A1* | 5/2023 | Tanabe .................. H02P 29/662 318/400.08 |

* cited by examiner

⟨B1⟩

⟨B2⟩

⟨B3⟩

⟨B4⟩

⟨B5⟩

⟨B6⟩

CONTROL APPARATUS FOR ROTATING ELECTRIC MACHINE

CROSS-REFERENCE TO RELATED APPLICATIONS

The present application is a continuation application of International Application No. PCT/JP2021/047889 filed on Dec. 23, 2021, which is based on and claims priority from Japanese Patent Application No. 2021-008624 filed on Jan. 22, 2021. The entire contents of these applications are incorporated by reference into the present application.

BACKGROUND

1 Technical Field

The present disclosure relates to control apparatuses for rotating electric machines.

2 Description of Related Art

There are known systems which include a rotating electric machine and an inverter. The rotating electric machine includes a rotor having permanent magnets and a stator having coils of a plurality of phases. The inverter has, for each of the plurality of phases, an upper-arm switch and a lower-arm switch both of which are electrically connected with the coil of the phase. All of the upper-arm switches of the respective phases together constitute an upper-arm switch group; and all of the lower-arm switches of the respective phases together constitute a lower-arm switch group. Moreover, there are also known control apparatuses which are applied to the above-described systems. The control apparatuses are configured to perform all-phase short-circuit control of turning on all of the switches of one of the upper-arm switch group and the lower-arm switch group and turning off all of the switches of the other of the upper-arm switch group and the lower-arm switch group.

SUMMARY

According to the present disclosure, there is provided a control apparatus to be applied to a system. The system includes a rotating electric machine and an inverter. The rotating electric machine includes a rotor having a permanent magnet and a stator having coils of a plurality of phases. The inverter has, for each of the plurality of phases, an upper-arm switch and a lower-arm switch both of which are electrically connected with the coil of the phase. Each of the upper-arm and lower-arm switches has a diode electrically connected in antiparallel thereto. All of the upper-arm switches of the plurality of phases together constitute an upper-arm switch group; and all of the lower-arm switches of the plurality of phases together constitute a lower-arm switch group. The control apparatus includes an all-phase short-circuiting unit and a single-phase short-circuiting unit. The all-phase short-circuiting unit is configured to perform all-phase short-circuit control of turning on all of the switches of one of the upper-arm switch group and the lower-arm switch group and turning off all of the switches of the other of the upper-arm switch group and the lower-arm switch group. The single-phase short-circuiting unit is configured to perform, in a regenerative drive state where the rotating electric machine functions as an electric generator and prior to execution of the all-phase short-circuit control by the all-phase short-circuiting unit, single-phase short-circuit control of turning on one of the upper-arm and lower-arm switches of one of the plurality of phases, turning off the other of the upper-arm and lower-arm switches of the one of the plurality of phases and turning off all of the upper-arm and lower-arm switches of the remainder of the plurality of phases.

DESCRIPTION OF EMBODIMENTS

Figure 1:
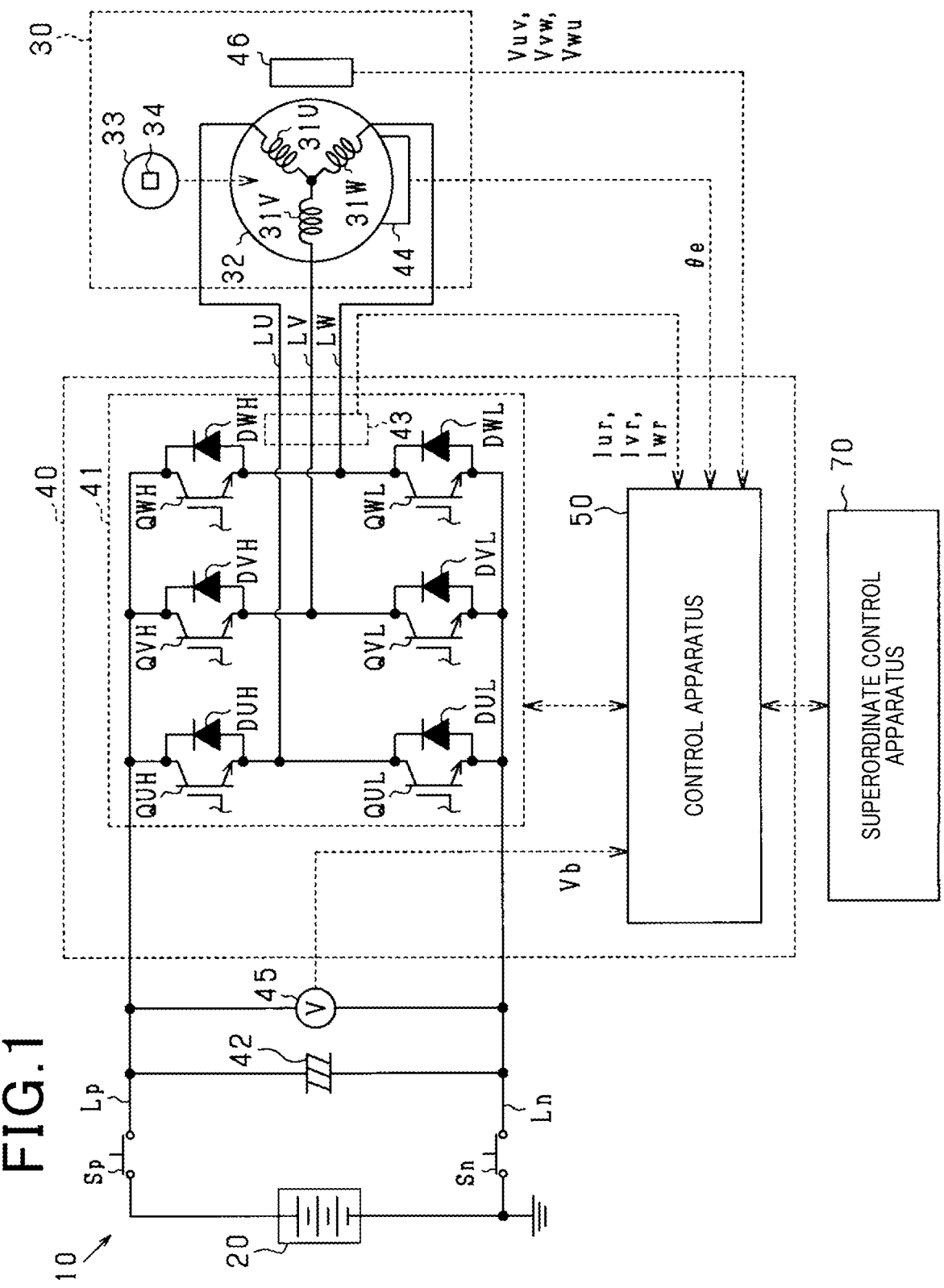
FIG. 1 is an overall configuration diagram of a control system according to a first embodiment.

In the case of the all-phase short-circuit control being performed by the control apparatuses known in the art, the operating point specified by d-axis and q-axis currents in a d-q coordinate system converges to a final arrival point where the d-axis current has a predetermined value on a field-weakening side. In this case, the operating point does not move straight from a start point where the all-phase short-circuit control is started to the final arrival point, but moves to the final arrival point along a spiral trajectory around the final arrival point. Moreover, during the movement of the operating point to the final arrival point, the d-axis current intermittently increases toward the field-weakening side. If the d-axis current becomes excessively high on the field-weakening side, the permanent magnets of the rotor of the rotating electric machine may become demagnetized.

A control performed for suppressing demagnetization of the permanent magnets may complicate the control process until execution of the all-phase short-circuit control. For example, according to the disclosure of Japanese Unexamined Patent Application Publication No. JP2019062589A, prior to execution of the all-phase short-circuit control, d-axis and q-axis current command values are changed so as to cause the d-axis current after execution of the all-phase short-circuit control to be reduced; and switching control of the upper-arm and lower-arm switches of the inverter is performed so as to bring the d-axis and q-axis currents respectively into agreement with the changed d-axis and q-axis current command values. In this case, it is necessary to change the d-axis and q-axis current command values and perform the switching control prior to execution of the all-phase short-circuit control; thus the control process until execution of the all-phase short-circuit control will become complicated.

The inventor of the present application has investigated how to solve the above problem, and has found that in a regenerative drive state where the rotating electric machine functions as an electric generator, the magnitude of transient d-axis current (i.e., d-axis current on the field-weakening side during execution of the all-phase short-circuit control) can be considerably reduced by performing single-phase short-circuit control that is a simple switching control.

The present disclosure has been accomplished based on the above finding by the inventor of the present application.

In the above-described control apparatus according to the present disclosure, in the case of the all-phase short-circuit control being performed when the rotating electric machine is in the regenerative drive state, the single-phase short-circuit control is performed prior to execution of the all-phase short-circuit control. Consequently, closed circuits are formed which include the turned-on switch of the one of the plurality of phases, some of the diodes of the other phases and the coils of the rotating electric machine. As a result, flyback current flows through the closed circuits formed by the single-phase short-circuit control, thereby making it possible to cause the operating point to move to a point where the magnitude of the transient d-axis current in a negative direction (or on the field-weakening side) is reduced. Therefore, when the all-phase short-circuit control is performed, the magnitude of the transient d-axis current in the negative direction is reduced, thereby making it possible to suppress demagnetization of the permanent magnet. As above, according to the present disclosure, it becomes possible to suppress demagnetization of the permanent magnet by temporarily performing the single-phase short-circuit control prior to execution of the all-phase short-circuit control.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, explanation of identical components will not be repeated.

First Embodiment

Hereinafter, a first embodiment embodying the control apparatus according to the present disclosure will be described with reference to FIGS. 1 to 12. The control apparatus according to the present embodiment constitutes, together with a rotating electric machine, a control system. The control system is installed in a vehicle and the rotating electric machine serves as a driving power source of the vehicle.

As shown in FIG. 1, the control system 10 includes a storage battery 20 as a DC power supply. The storage battery 20 has a terminal voltage (or power supply voltage Vdc) of, for example, 100V or higher. The storage battery 20 is implemented by an assembled battery that is constituted of a plurality of battery cells connected in series with each other. The battery cells may be, for example, lithium-ion battery cells or nickel-metal hydride battery cells.

The control system 10 also includes the rotating electric machine 30 and an inverter 40. The inverter 40 electrically connects the storage battery 20 and the rotating electric machine 30. In the present embodiment, the rotating electric machine 30 is configured as a synchronous machine, more particularly as a permanent magnet synchronous machine.

The rotating electrical machine 30 includes a stator 32 and a rotor 33. The stator 32 includes a U-phase coil 31U, a V-phase coil 31V and a W-phase coil 31W. The U-phase, V-phase and W-phase coils 31U, 31V and 31W are arranged so as to be offset from each other by 120° in electrical angle. The rotor 33 includes permanent magnets 34 and a rotating shaft (not shown). The rotating shaft is connected, via a transmission (not shown), a shaft (not shown) and the like, to driving wheels of the vehicle.

The inverter 40 includes a switching device unit 41. Further, the switching device unit 41 includes serially-connected switch pairs of three phases. Specifically, the switching device unit 41 includes: a U-phase serially-connected switch pair consisting of a U-phase upper-arm switch QUH and a U-phase lower-arm switch QUL that are connected in series with each other; a V-phase serially-connected switch pair consisting of a V-phase upper-arm switch QVH and a V-phase lower-arm switch QVL that are connected in series with each other; and a W-phase serially-connected switch pair consisting of a W-phase upper-arm switch QWH and a W-phase lower-arm switch QWL that are connected in series with each other. In the present embodiment, each of the upper-arm and lower-arm switches QUH to QWH and QUL to QWL is configured with a voltage-controlled semiconductor switching element, more particularly with an IGBT (Insulated Gate Bipolar Transistor). Therefore, each of the upper-arm and lower-arm switches QUH to QWH and QUL to QWL has its collector serving as a higher-potential-side terminal and its emitter serving as a lower-potential-side terminal. Moreover, each of the upper-arm and lower-arm switches QUH to QWH and QUL to QWL has a corresponding one of upper-arm and lower-arm diodes DUH, DVH, DWH, DUL, DVL and DWL connected in antiparallel thereto. Each of the upper-arm and lower-arm diodes DUH, DVH, DWH, DUL, DVL and DWL is a freewheeling diode (or flyback diode).

A first end of the U-phase coil 31U is connected with both the emitter of the U-phase upper-arm switch QUH and the collector of the U-phase lower-arm switch QUL via a U-phase conductive member LU such as a busbar. A first end of the V-phase coil 31V is connected with both the emitter of the V-phase upper-arm switch QVH and the collector of the V-phase lower-arm switch QVL via a V-phase conductive member LV such as a busbar. A first end of the W-phase coil 31W is connected with both the emitter of the W-phase upper-arm switch QWH and the collector of the W-phase lower-arm switch QWL via a W-phase conductive member LW such as a busbar. Second ends of the U-phase, V-phase and W-phase coils 31U, 31V and 31W are connected together to define a neutral point O. That is, in the present embodiment, the U-phase, V-phase and W-phase coils 31U, 31V and 31W are star-connected. In addition, in the present embodiment, the numbers of turns of the U-phase, V-phase and W-phase coils 31U, 31V and 31W are set to be equal to each other. Consequently, the inductances of the U-phase, V-phase and W-phase coils 31U, 31V and 31W are also set to be equal to each other.

The control system 10 further includes first and second cutoff switches Sp and Sn. In the present embodiment, each of the first and second cutoff switches Sp and Sn is implemented by a relay (more particularly, for example, by a system main relay). The collectors of the upper-arm switches QUH, QVH and QWH are connected with a first end of the first cutoff switch Sp via a positive-electrode-side bus Lp such as a busbar. The emitters of the lower-arm switches QUL, QVL and QWL are connected with a first end of the second cutoff switch Sn via a negative-electrode-side bus Ln such as a busbar. A positive-electrode-side terminal of the storage battery 20 is connected with a second end of the first cutoff switch Sp, whereas a negative-electrode-side terminal of the storage battery 20 is connected with a second end of the second cutoff switch Sn. In the present embodiment, the negative-electrode-side bus Ln is connected to the ground.

The inverter 40 includes a control apparatus 50, and the control system 10 includes a superordinate control apparatus 70. The cutoff switches Sp and Sn are operated by the control apparatus 50 or the superordinate control apparatus 70.

The control system 10 further includes a smoothing capacitor 42. The smoothing capacitor 42 connects the positive-electrode-side bus Lp and the negative-electrode-side bus Ln. It should be noted that the smoothing capacitor 42 may be either built in the inverter 40 or provided outside the inverter 40.

When the cutoff switches Sp and Sn are in an ON state, the storage battery and the smoothing capacitor 42 together serve as a power storage unit that supplies an input voltage of the inverter 40. In contrast, when the cutoff switches Sp and Sn are in an OFF state, of the storage battery 20 and the smoothing capacitor 42, only the smoothing capacitor 42 serves as a power storage unit that supplies the input voltage of the inverter 40.

The control system 10 further includes a phase current detection unit 43, an angle detection unit 44 and a DC voltage detection unit 45. The phase current detection unit 43 is configured to detect at least two of three phase currents flowing respectively through the U-phase, V-phase and W-phase coils 31U, 31V and 31W of the rotating electric machine 10. For each of the phase currents, the direction of the phase current is defined to be positive when the phase current flows from the corresponding phase coil to a junction point of the corresponding serially-connected switch pair consisting of the corresponding upper-arm and lower-arm switches, and be negative when the phase current flows from the junction point of the corresponding serially-connected switch pair consisting of the corresponding upper-arm and lower-arm switches to the corresponding phase coil. The angle detection unit 44 is configured to detect an electrical angle of the rotor 33. The angle detection unit 44 may be implemented by, for example, a resolver. The DC voltage detection unit 45 is configured to detect the power supply voltage Vdc which is a terminal voltage of the smoothing capacitor 42. In addition, in the present embodiment, since the phase coils 31U to 31W are star-connected, the phase currents are equal to the line currents.

The control system 10 further includes a line-to-line voltage detection unit 46. The line-to-line voltage detection unit 46 is configured to detect, with the electric potential of the negative-electrode-side bus Ln being a reference voltage (0V), a U-V-phases line-to-line voltage Vuv between the U-phase coil 31U and the V-phase coil 31V, a V-W-phases line-to-line voltage Vvw between the V-phase coil 31V and the W-phase coil 31W and a W-U-phases line-to-line voltage Vwu between the W-phase coil 31W and the U-phase coil 31U. Detected values of the detection units 43 to 46 are inputted to the control apparatus 50. In addition, in the present embodiment, the control apparatus 50 corresponds to a "line-to-line voltage acquisition unit".

The control apparatus 50 is implemented by an ECU (Electronic Control Unit) which includes a CPU, a RAM, a ROM and the like. The control apparatus 50 performs power running drive control (or motoring drive control). The power running drive control is switching control of the upper-arm and lower-arm switches QUH to QWH and QUL to QWL for converting the DC power outputted from the storage battery 20 into AC power and supplying the AC power to the rotating electric machine 30. When the power running drive control is performed, the rotating electric machine 30 functions as an electric motor to generate power running torque (>0) with the supplied AC power. Moreover, the control apparatus 50 also performs regenerative drive control. The regenerative drive control is switching control of the upper-arm and lower-arm switches QUH to QWH and QUL to QWL for converting AC power generated by the rotating electric machine 30 into DC power and supplying the DC power to the storage battery 20. When the regenerative drive control is performed, the rotating electric machine 30 functions as an electric generator to generate the AC power with regenerative torque (<0).

Figure 2:
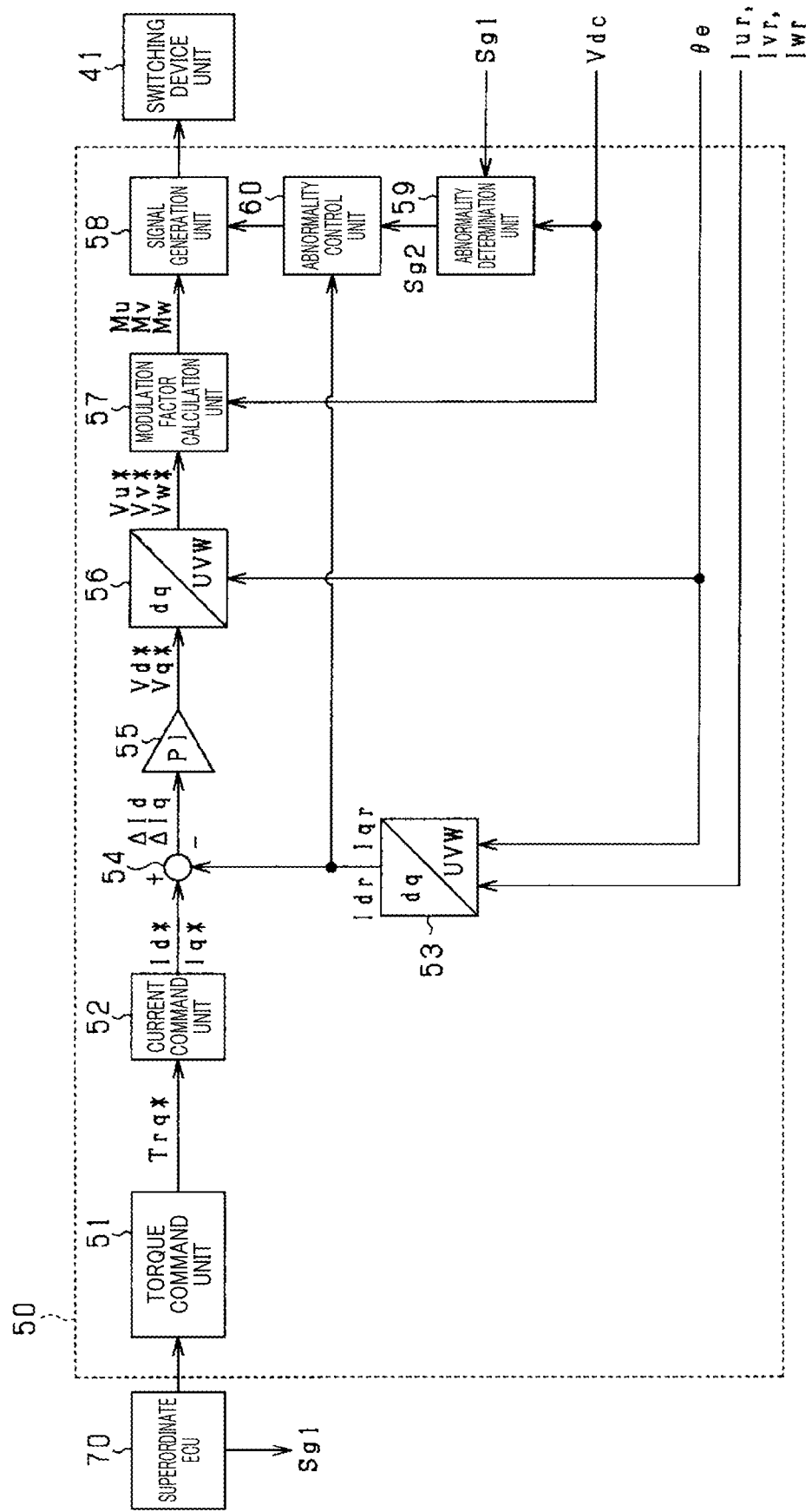
FIG. 2 is a functional block diagram of a control apparatus according to the first embodiment.

FIG. 2 is a functional block diagram of the control apparatus 50 according to the present embodiment. In the control apparatus 50, a torque command unit 51 calculates a torque command value Trq* in response to receipt of a command from the superordinate control apparatus 70. A current command unit 52 calculates both a d-axis current command value Id* and a q-axis current command value Iq* on the basis of the torque command value Trq* calculated by the torque command unit 51. A dq conversion unit 53 calculates both a d-axis current value Idr and a q-axis current value Iqr in a d-q coordinate system on the basis of the phase currents Iur, Ivr and Iwr detected by the phase current detection unit 43 and the electrical angle θe detected by the angle detection unit 44. In addition, in the present embodiment, the dq conversion unit 53 corresponds to both a "d-axis-and-q-axis-currents acquisition unit" and a "q-axis-current acquisition unit".

A deviation calculation unit 54 calculates a d-axis current deviation ΔId that is the difference between the d-axis current command value Id* and the d-axis current value Idr, and calculates a q-axis current deviation ΔIq that is the difference between the q-axis current command value Iq* and the q-axis current value Iqr.

A feedback control unit 55 calculates a d-axis voltage command value Vd* as a manipulated variable for feedback-controlling the d-axis current deviation ΔId to 0, and calculates a q-axis voltage command value Vq* as a manipulated variable for feedback-controlling the q-axis current deviation ΔIq to 0. The feedback control may be, for example, proportional-plus-integral control.

A UVW conversion unit 56 calculates U-phase, V-phase and W-phase voltage command values Vu*, Vv* and Vw* on the basis of the d-axis and q-axis voltage command values Vd* and Vq* calculated by the feedback control unit 55 and the electrical angle θe detected by the angle detection unit 44.

A modulation factor calculation unit 57 calculates U-phase, V-phase and W-phase modulation factors Mu, Mv and Mw on the basis of the U-phase, V-phase and W-phase voltage command values Vu*, Vv* and Vw* calculated by the UVW conversion unit 56 and the power supply voltage Vdc detected by the DC voltage detection unit 45. Specifically, the modulation factor calculation unit 57 calculates: the U-phase modulation factor Mu by dividing the U-phase voltage command value Vu* by the power supply voltage Vdc; the V-phase modulation factor Mv by dividing the V-phase voltage command value Vv* by the power supply voltage Vdc; and the W-phase modulation factor Mw by dividing the W-phase voltage command value Vw* by the power supply voltage Vdc.

A signal generation unit 58 generates gate signals for the upper-arm and lower-arm switches QUH to QWH and QUL to QWL on the basis of the U-phase, V-phase and W-phase modulation factors Mu, Mv and Mw calculated by the modulation factor calculation unit 57. Specifically, the signal generation unit 58 may generate the gate signals on the basis of, for example, comparison in magnitude between each of the modulation factors Mu, My and Mw and a carrier signal (e.g., a triangular wave signal). The gate signals are signals for turning on or turning off the upper-arm and lower-arm switches QUH to QWH and QUL to QWL. The gate signals are inputted to the switching device unit 41, whereby switching control of the upper-arm and lower-arm switches QUH to QWH and QUL to QWL is performed.

The control apparatus 50 further includes an abnormality determination unit 59 and an abnormality control unit 60. The abnormality determination unit 59 determines, based on a first signal Sg1 outputted from the superordinate control apparatus 70 and the power supply voltage Vdc, whether an overvoltage abnormality has occurred in the smoothing capacitor 42; then, the abnormality determination unit 59 generates a second signal Sg2 that is indicative of the result of the determination. The first signal Sg1 is a signal for communicating information on whether an abnormality has occurred in the vehicle, whereas the second signal Sg2 is a signal for communicating information on whether the overvoltage abnormality has occurred in the smoothing capacitor 42. The second signal Sg2 is inputted to the abnormality control unit 60. In addition, the abnormality determination unit 59 will be described in detail later.

The overvoltage abnormality tends to occur when the permanent magnets 34 of the rotor 33 of the rotating electrical machine 30 has a high magnetic flux density for achieving high torque of the rotating electric machine 30. This is because the higher the magnetic flux density of the permanent magnets 34, the more likely it is that the counterelectromotive force generated in the coils will become high and thus the more likely it is that an excessively high voltage will be applied to the smoothing capacitor 42. In addition, for achieving high torque, as described, for example, in Japanese Unexamined Patent Application Publication No. JP2019106866A, the rotating electric machine 30 may be configured to have a slot-less structure; and the permanent magnets 34 may be implemented by permanent magnets whose intrinsic coercive force is higher than or equal to 400 [kA/m] and residual flux density is higher than or equal to 1.0 [T].

The abnormality control unit 60 generates a shutdown command signal or a three-phase short-circuit command signal depending on the second signal Sg2. The shutdown command signal is a signal which is generated when it is determined by the abnormality control unit 60 to perform shutdown control of turning off all of the upper-arm and lower-arm switches QUH to QWH and QUL to QWL. In contrast, the three-phase short-circuit command signal is a signal which is generated when it is determined by the abnormality control unit 60 to perform three-phase short-circuit control of turning off all of the upper-arm switches QUH to QWH and turning on all of the lower-arm switches QUL to QWL. The shutdown command signal and the three-phase short-circuit command signal are inputted to the signal generation unit 58. The abnormality control unit 60 will be described in detail later. In addition, in the present embodiment, the three-phase short-circuit control corresponds to "all-phase short-circuit control".

In response to input of the shutdown command signal, the signal generation unit 58 generates the gate signals so as to turn off all of the upper-arm and lower-arm switches QUH to QWH and QUL to QWL. Consequently, the shutdown control is performed. Otherwise, in response to input of the three-phase short-circuit command signal, the signal generation unit 58 generates the gate signals so as to turn off all of the upper-arm switches QUH to QWH and turn on all of the lower-arm switches QUL to QWL. Consequently, the three-phase short-circuit control is performed.

Figure 3:
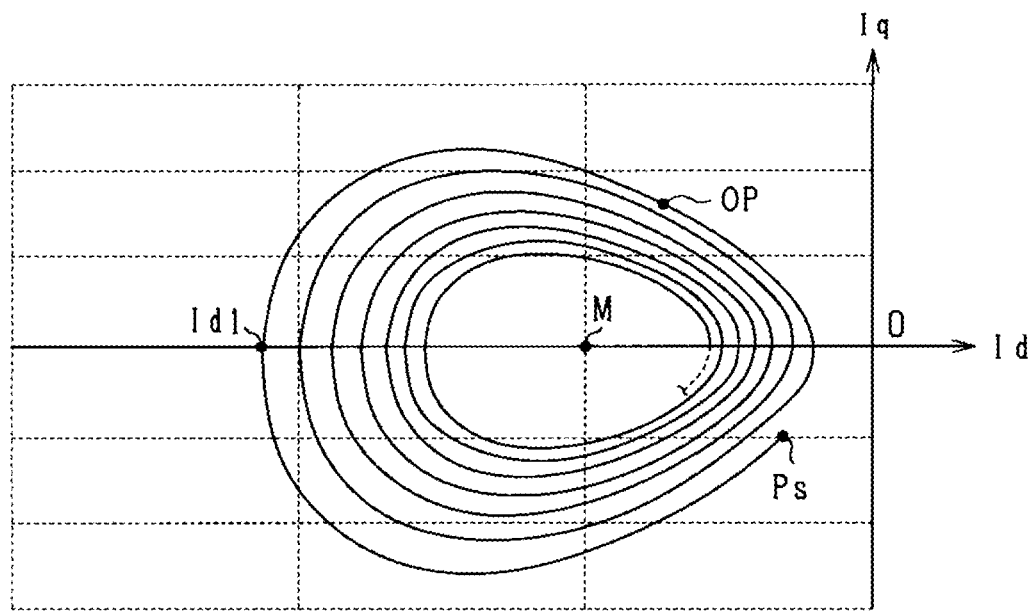
FIG. 3 is a diagram illustrating changes in d-axis and q-axis currents when three-phase short-circuit control is continuously performed.

FIG. 3 illustrates an example of changes in the d-axis and q-axis currents Id and Iq when the three-phase short-circuit control is continuously performed. Hereinafter, the point specified by the d-axis and q-axis currents Id and Iq in the d-q coordinate system will be referred to as the operating point OP. Moreover, in the present embodiment, the direction of the d-axis current Id is defined to be positive when field-strengthening is performed, and be negative when field-weakening is performed. On the other hand, the direction of the q-axis current Iq is defined to be positive when the power running torque is generated in a first rotational direction of the rotor 33 under the power running drive control, and be negative when the regenerative torque is generated in a second rotational direction of the rotor 33, which is opposite to the first rotational direction, under the regenerative drive control.

When the three-phase short-circuit control is performed, flyback current flows through the inverter 40 and the coils 31U, 31V and 31W of the respective phases. As shown in FIG. 3, the operating point OP finally converges to a final arrival point M where the q-axis current Iq has a predetermined q-axis current value Iq0 and the d-axis current Id has a predetermined d-axis current value Id0. When the electrical angular speed of the rotating electric machine 30 is high, the predetermined q-axis current value Iq0 is substantially equal to 0. In contrast, when the electrical angular speed of the rotating electric machine 30 is low, the predetermined q-axis current value Iq0 is a negative value. On the other hand, the predetermined d-axis current value Id0 is, for example, a value when the magnitude of the magnetic flux of the permanent magnets 34 is equal to the magnitude of magnetic flux that is generated by the d-axis current Id in the coils 31U, 31V and 31W of the respective phases in the direction of canceling the magnetic flux of the permanent magnets 34. Specifically, the predetermined d-axis current value Id0 and the predetermined q-axis current value Iq0 can be expressed by the following equations.

$$Id0 = -\frac{\omega^2 \cdot \phi \cdot Lq}{R^2 + \omega^2 \cdot Ld \cdot Lq}$$

$$Iq0 = -\frac{\omega \cdot \phi \cdot R}{R^2 + \omega^2 \cdot Ld \cdot Lq}$$

In the above equations, $\phi$ is the magnetic flux of the permanent magnets 34; R is the resistance of each of the coils 31U, 31V and 31W; Ld is the d-axis inductance; Lq is the q-axis inductance; and $\omega$ is the electrical angular speed of the rotating electric machine 30.

The operating point OP does not move straight from a start point Ps where the three-phase short-circuit control is started to the final arrival point M, but moves to the final arrival point M along a spiral trajectory around the final arrival point M in the clockwise direction. In the example illustrated in FIG. 3, the trajectory of the operating point OP from the start point Ps to the final arrival point M exists in a region including the second and third quadrants and the d-axis between the second and third quadrants in the d-q coordinate system. In the second quadrant of the d-q coordinate system, the q-axis current Iq is positive whereas the d-axis current Id is negative. On the other hand, in the third quadrant of the d-q coordinate system, both the q-axis current Iq and the d-axis current Id are negative.

When the three-phase short-circuit control is performed, the transient d-axis current during the movement of the operating point OP to the final arrival point M intermittently increases in the negative direction. In FIG. 3, the maximum value of the transient d-axis current in the negative direction is denoted by Id1. If the transient d-axis current becomes excessively high in the negative direction, the permanent magnets 34 of the rotor 33 may become demagnetized.

Conventionally, control for suppressing demagnetization of the permanent magnets 34 is performed prior to execution of the three-phase short-circuit control. However, the control for suppressing demagnetization of the permanent magnets 34 may complicate the control process until execution of the three-phase short-circuit control. The inventor of the present application has investigated how to solve the above problem, and has found that in a regenerative drive state where the rotating electric machine 30 functions as an electric generator, the magnitude of the transient d-axis current can be considerably reduced by performing single-phase short-circuit control that is a simple switching control.

Based on the above finding by the inventor of the present application, in the present embodiment, the abnormality control unit 60 is configured to perform the single-phase short-circuit control prior to execution of the three-phase short-circuit control in the regenerative drive state. The single-phase short-circuit control is a control of turning on one of the upper-arm and lower-arm switches QUH to QWH and QUL to QWL and turning off the remainder of the upper-arm and lower-arm switches QUH to QWH and QUL to QWL. Hereinafter, switching patterns for the single-phase short-circuit control will be described.

In the present embodiment, the abnormality control unit 60 selects, according to the states of the phase currents Iur, Ivr and Iwr, that one of the upper-arm and lower-arm switches QUH to QWH and QUL to QWL which is to be turned on in the single-phase short-circuit control.

Figure 4:
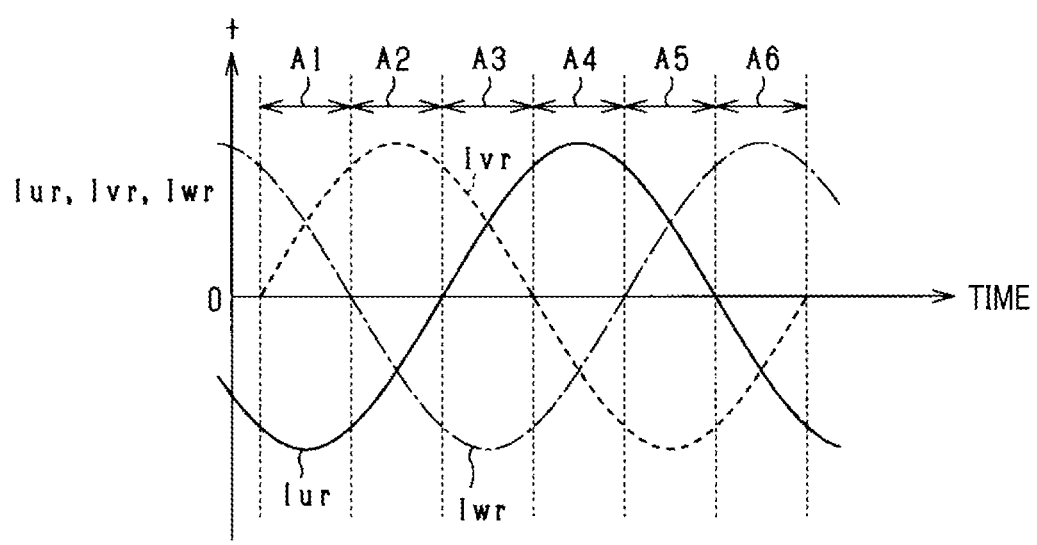
FIG. 4 is a diagram illustrating an example of waveforms of phase currents.

FIG. 4 illustrates an example of the waveforms of the phase currents Iur, Ivr and Iwr detected by the phase current detection unit 43 in the regenerative drive state of the rotating electrical machine 30. In FIG. 4, the solid line represents the waveform of the U-phase current Iur; the dashed line represents the waveform of the V-phase current Ivr; and the chain line represents the waveform of the W-phase current Iwr.

The states of the phase current Iur, Ivr and Iwr can be classified into first to sixth current patterns A1 to A6. Specifically, in the first current pattern A1, of the three phases of the switching device unit 41, the phase which has the maximum phase-current absolute value is the U phase; and the U-phase current Iur is negative. In the second current pattern A2, of the three phases of the switching device unit 41, the phase which has the maximum phase-current absolute value is the V phase; and the V-phase current Ivr is positive. In the third current pattern A3, of the three phases of the switching device unit 41, the phase which has the maximum phase-current absolute value is the W phase; and the W-phase current Iwr is negative. In the fourth current pattern A4, of the three phases of the switching device unit 41, the phase which has the maximum phase-current absolute value is the U phase; and the U-phase current Iur is positive. In the fifth current pattern A5, of the three phases of the switching device unit 41, the phase which has the maximum phase-current absolute value is the V phase; and the V-phase current Ivr is negative. In the sixth current pattern A6, of the three phases of the switching device unit 41, the phase which has the maximum phase-current absolute value is the W phase; and the W-phase current Iwr is positive.

In performing the single-phase short-circuit control, the abnormality control unit 60 first selects, of the three phases of the switching device unit 41, the phase which has the maximum phase-current absolute value. Then, of the upper and lower arms of the selected phase, the abnormality control unit 60 turns on the switch of the arm in which no electric current is flowing through the diode, and turns off the switch of the arm in which electric current is flowing through the diode. Moreover, the abnormality control unit 60 turns off all of the upper-arm and lower-arm switches of the other phases of the switching device unit 41 than the selected phase.

FIGS. 5 to 10 are diagrams illustrating the paths of electric current flowing through the control system 10 in the current patterns A1 to A6. It should be noted that in FIGS. 5 to 10, those components which are also shown in FIG. 1 are designated by the same reference numerals as in FIG. 1; and all of the upper-arm and lower-arm switches QUH to QWH and QUL to QWL are in an OFF state.

Figure 5:
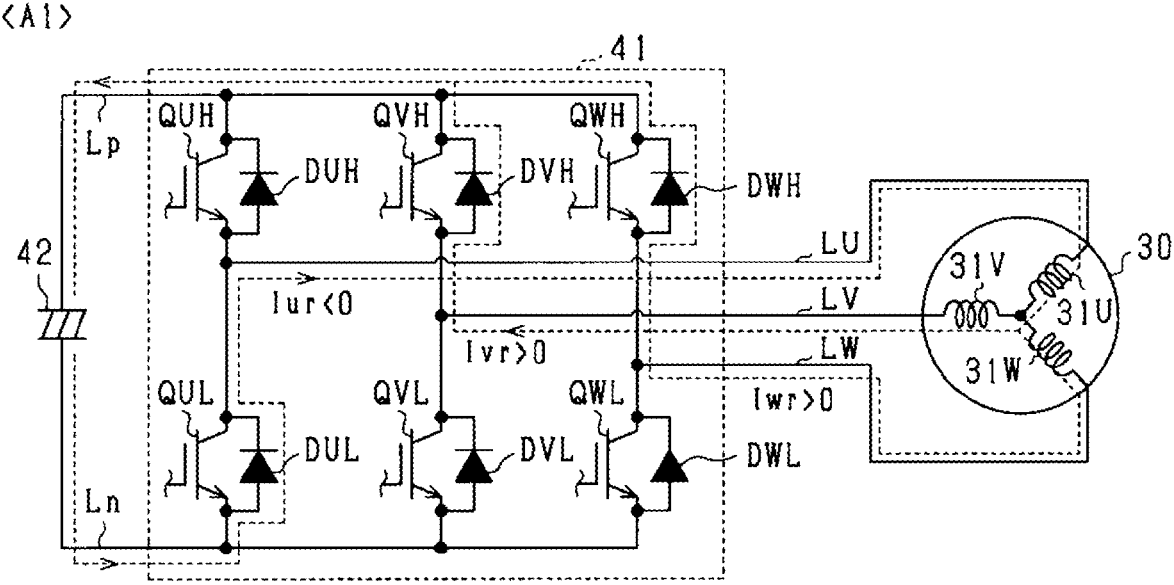
FIG. 5 is a diagram illustrating electric current paths in a first current pattern.

FIG. 5 illustrates the electric current paths in the first current pattern A1. In the first current pattern A1, electric current flows along the paths of: the smoothing capacitor 42→the negative-electrode-side bus Ln→the U-phase lower-arm diode DUL→the U-phase conductive member LU→the U-phase coil 31U→the V-phase and W-phase coils 31V and 31W→the V-phase and W-phase conductive members LV and LW→the V-phase and W-phase upper-arm diodes DVH and DWH→the positive-electrode-side bus Lp→the smoothing capacitor 42. In this case, the abnormality control unit 60 selects the U phase and performs the single-phase short-circuit control of turning on the U-phase upper-arm switch QUH and turning off the U-phase lower-arm switch QUL. Consequently, closed circuits are formed which include the U-phase upper-arm switch QUH, the V-phase and W-phase upper-arm diodes DVH and DWH, and the coils 31U, 31V and 31W of the respective phases.

Figure 6:
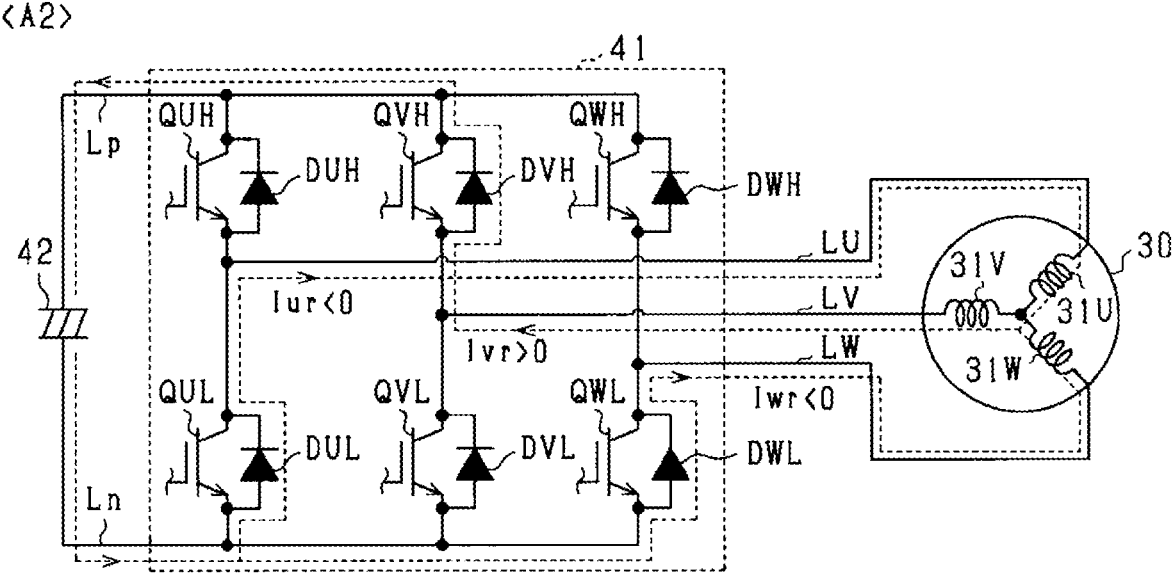
FIG. 6 is a diagram illustrating electric current paths in a second current pattern.

FIG. 6 illustrates the electric current paths in the second current pattern A2. In the second current pattern A2, electric current flows along the paths of: the smoothing capacitor 42→the negative-electrode-side bus Ln→the U-phase and W-phase lower-arm diodes DUL and DWL→the U-phase and W-phase conductive members LU and LW→the U-phase and W-phase coils 31U and 31W→the V-Phase coil 31V→the V-phase conductive member LV→the V-phase upper-arm diode DVH→the positive-electrode-side bus Lp→the smoothing capacitor 42. In this case, the abnormality control unit 60 selects the V phase and performs the single-phase short-circuit control of turning on the V-phase lower-arm switch QVL and turning off the V-phase upper-arm switch QVH. Consequently, closed circuits are formed which include the V-phase lower-arm switch QVL, the U-phase and W-phase lower-arm diodes DUL and DWL, and the coils 31U, 31V and 31W of the respective phases.

Figure 7:
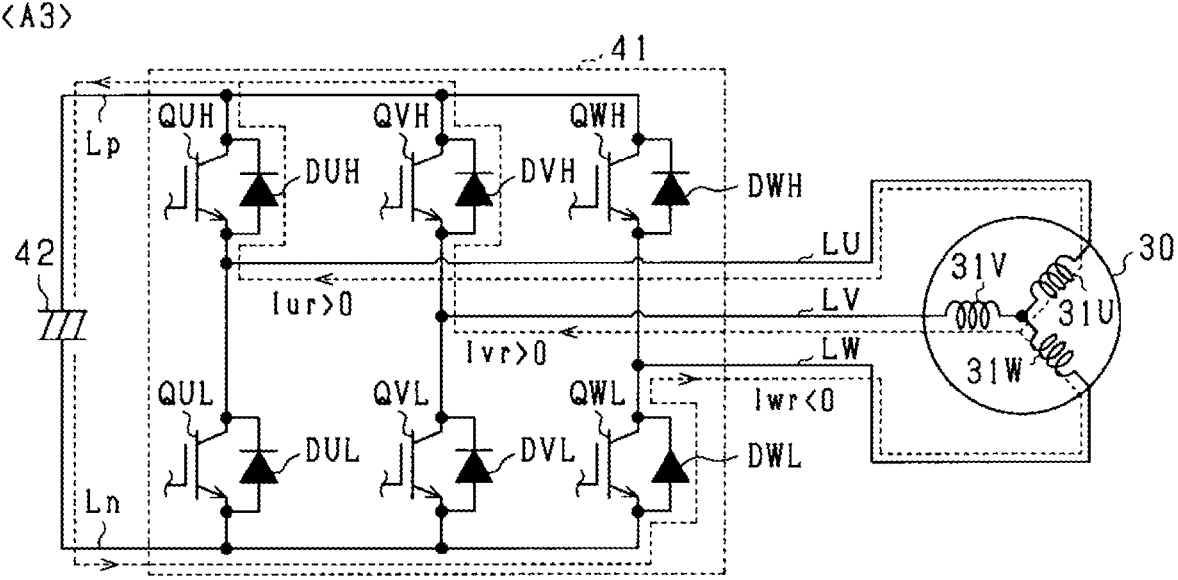
FIG. 7 is a diagram illustrating electric current paths in a third current pattern.

FIG. 7 illustrates the electric current paths in the third current pattern A3. In the third current pattern A3, electric current flows along the paths of: the smoothing capacitor 42→the negative-electrode-side bus Ln→the W-phase lower-arm diode DWL→the W-phase conductive member LW→the W-phase coil 31W→the U-phase and V-phase coils 31U and 31V→the U-phase and V-phase conductive members LU and LV→the U-phase and V-phase upper-arm diodes DUH and DVH→the positive-electrode-side bus Lp→the smoothing capacitor 42. In this case, the abnormality control unit 60 selects the W phase and performs the single-phase short-circuit control of turning on the W-phase upper-arm switch QWH and turning off the W-phase lower-arm switch QWL. Consequently, closed circuits are formed which include the W-phase upper-arm switch QWH, the U-phase and V-phase upper-arm diodes DUH and DVH, and the coils 31U, 31V and 31W of the respective phases.

Figure 8:
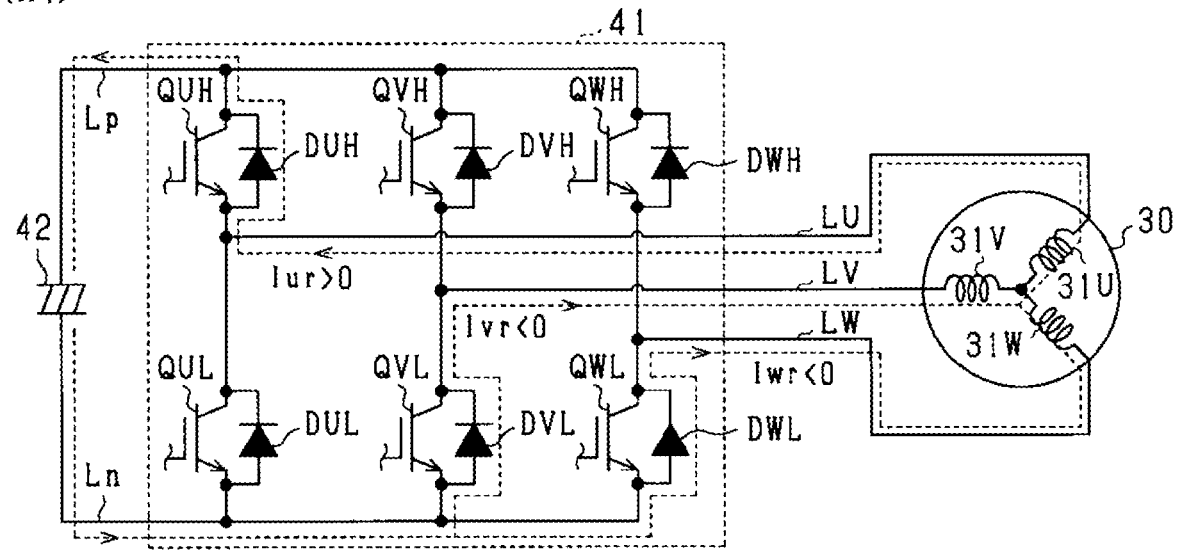
FIG. 8 is a diagram illustrating electric current paths in a fourth current pattern.

FIG. 8 illustrates the electric current paths in the fourth current pattern A4. In the fourth current pattern A4, electric current flows along the paths of: the smoothing capacitor 42→the negative-electrode-side bus Ln→the V-phase and W-phase lower-arm diodes DVL and DWL→the V-phase and W-phase conductive members LV and LW→the V-phase and W-phase coils 31V and 31W→the U-phase coil 31U→the U-phase conductive member LU→the U-phase upper-arm diode DUH→the positive-electrode-side bus Lp→the smoothing capacitor 42. In this case, the abnormality control unit 60 selects the U phase and performs the single-phase short-circuit control of turning on the U-phase lower-arm switch QUL and turning off the U-phase upper-arm switch QUH. Consequently, closed circuits are formed which include the U-phase lower-arm switch QUL, the V-phase and W-phase lower-arm diodes DVL and DWL, and the coils 31U, 31V and 31W of the respective phases.

Figure 9:
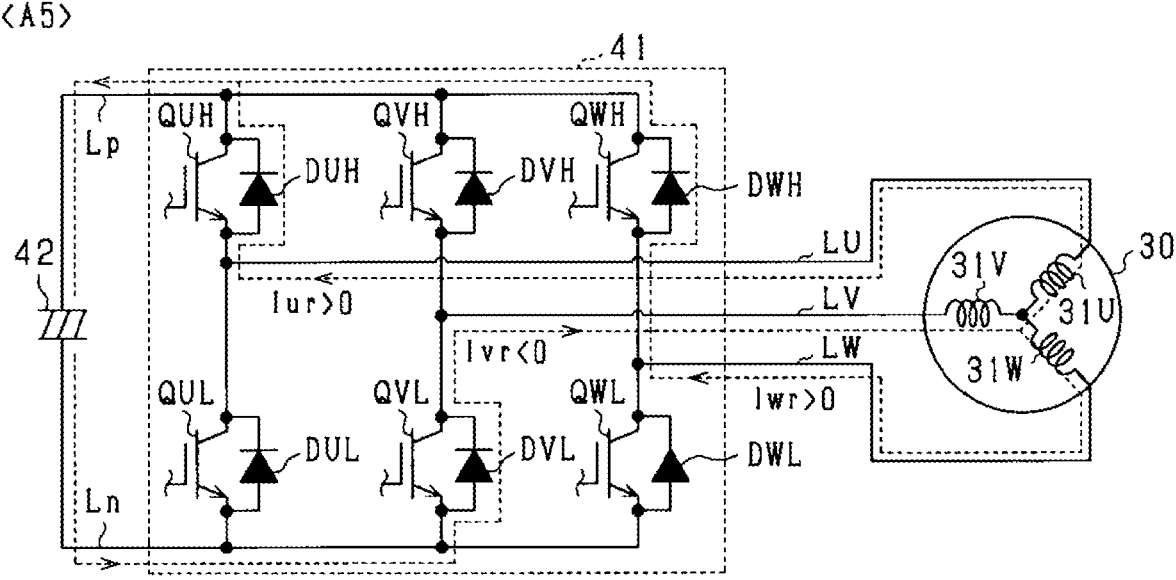
FIG. 9 is a diagram illustrating electric current paths in a fifth current pattern.

FIG. 9 illustrates the electric current paths in the fifth current pattern A5. In the fifth current pattern A5, electric current flows along the paths of: the smoothing capacitor 42→the negative-electrode-side bus Ln→the V-phase lower-arm diode DVL→the V-phase conductive member LV→the V-phase coil 31V→the U-phase and W-phase coils 31U and 31W→the U-phase and W-phase conductive members LU and LW→the U-phase and W-phase upper-arm diodes DUH and DWH→the positive-electrode-side bus Lp→the smoothing capacitor 42. In this case, the abnormality control unit 60 selects the V-phase and performs the single-phase short-circuit control of turning on the V-phase upper-arm switch QVH and turning off the V-phase lower-arm switch QVL. Consequently, closed circuits are formed which include the V-phase upper-arm switch QVH, the U-phase and W-phase upper-arm diodes DUH and DWH, and the coils 31U, 31V and 31W of the respective phases.

Figure 10:
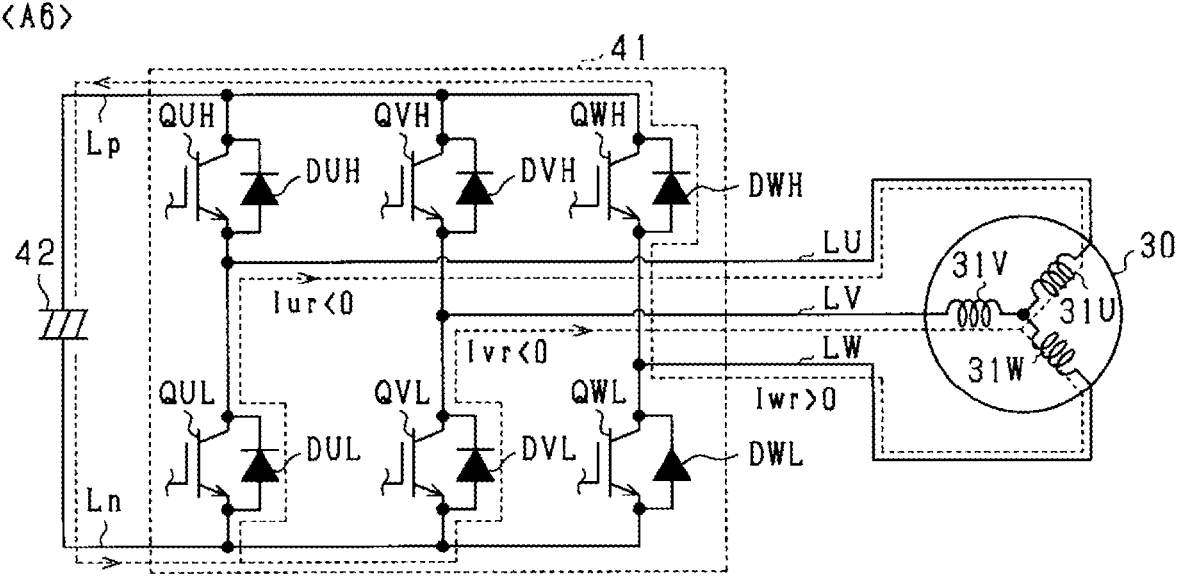
FIG. 10 is a diagram illustrating electric current paths in a sixth current pattern.

FIG. 10 illustrates the electric current paths in the sixth current pattern A6. In the sixth current pattern A6, electric current flows along the paths of: the smoothing capacitor 42→the negative-electrode-side bus Ln→the U-phase and V-phase lower-arm diodes DUL and DVL→the U-phase and V-phase conductive members LU and LV→the U-phase and V-phase coils 31U and 31V→the W-phase coil 31W→the W-phase conductive member LW→the W-phase upper-arm diode DWH→the positive-electrode-side bus Lp→the smoothing capacitor 42. In this case, the abnormality control unit 60 selects the W phase and performs the single-phase short-circuit control of turning on the W-phase lower-arm switch QWL and turning off the W-phase upper-arm switch QWH. Consequently, closed circuits are formed which include the W-phase lower-arm switch QWL, the U-phase and V-phase lower-arm diodes DUL and DVL, and the coils 31U, 31V and 31W of the respective phases.

The abnormality control unit 60 generates a single-phase short-circuit command signal for performing the above-described single-phase short-circuit control. The single-phase short-circuit command signal is a signal which is generated when the single-phase short-circuit control is determined by the abnormality control unit 60 to be performed. Consequently, with execution of the single-phase short-circuit control, closed circuits are formed in the rotating electric machine 30 and the switching device unit 41. As a result, flyback current flows through the closed circuits, thereby making it possible to cause the operating point OP to move to a point where the magnitude of the transient d-axis current is reduced.

As above, the control apparatus 50 according to the present embodiment is configured to properly perform the single-phase short-circuit control.

The superordinate control apparatus 70 determines whether an abnormality has occurred in the vehicle. For example, the superordinate control apparatus 70 may determine, upon determination that any one of the following conditions (1) to (3) is satisfied, that an abnormality has occurred in the vehicle.

(1) An airbag of the vehicle has been activated due to collision of the vehicle.

(2) The vehicle is being towed by another vehicle.

(3) An abnormality has occurred in the control system 10.

Abnormalities of the control system 10 include abnormalities of at least one of the rotating electric machine 30 and the inverter 40. In the present embodiment, the control apparatus 50 has a function of detecting the ON/OFF states of the upper-arm and lower-arm switches QUH to QWH and QUL to QWL of the switching device unit 41 and notifying the superordinate control apparatus 70 of the results of the detection. Then, the superordinate control apparatus 70 determines, based on the results of the detection by the control apparatus 50, whether an abnormality has occurred in the switching device unit 41.

In the present embodiment, the control apparatus 50 is configured so that when it is determined by the superordinate control apparatus 70 that an abnormality has occurred in the vehicle, the drive signals (or gate signals) of each phase outputted from the signal generation unit 58 indicate an OFF command. This configuration can be realized by, for example, outputting a command, from the superordinate control apparatus 70 to the torque command unit 51, to stop calculation of the torque command value Trq*. Moreover, the superordinate control apparatus 70 has a function of notifying, when it is determined that an abnormality has occurred in the vehicle, the vehicle driver of occurrence of the abnormality in the vehicle. In addition, occurrence of an abnormality in the vehicle may be notified to the vehicle driver visually or audibly. Specifically, occurrence of an abnormality in the vehicle may be notified by displaying a message on a display unit such as an instrument panel of the vehicle or by a voice message.

The superordinate control apparatus 70 sets the logic of the first signal Sg1 to L when it is determined that no abnormality has occurred in the vehicle, and sets the logic of the first signal Sg1 to H when it is determined that an abnormality has occurred in the vehicle. The first signal Sg1 is inputted to the abnormality determination unit 59.

When the logic of the first signal Sg1 is set to H, the abnormality determination unit 59 generates the second signal Sg2 according to the power supply voltage Vdc detected by the DC voltage detection unit 45. Specifically, when the logic of the first signal Sg1 is set to H, the abnormality determination unit 59 determines whether the power supply voltage Vdc is higher than an overvoltage threshold Vj. Further, when the power supply voltage Vdc is determined to be lower than or equal to the overvoltage threshold Vj, the abnormality determination unit 59 determines that no overvoltage abnormality has occurred in the smoothing capacitor 42. In this case, the abnormality determination unit 59 sets the logic of the second signal Sg2 to L. In contrast, when the power supply voltage Vdc is determined to be higher than the overvoltage threshold Vj, the abnormality determination unit 59 determines that the overvoltage abnormality has occurred in the smoothing capacitor 42. In this case, the abnormality determination unit 59 sets the logic of the second signal Sg2 to H. The second signal Sg2 is inputted to the abnormality control unit 60.

On the other hand, when the logic of the first signal Sg1 is set to L, the abnormality determination unit 59 does not generate the second signal Sg2; thus, the abnormality control unit 60 generates neither the shutdown command signal nor the three-phase short-circuit command signal. In this case, switching control of the upper-arm and lower-arm switches QUH to QWH and QUL to QWL may be performed based on, for example, the gate signals generated by the signal generation unit 58.

When the logic of the second signal Sg2 is set to L, the abnormality control unit 60 determines to perform the shutdown control. In this case, the abnormality control unit 60 generates the shutdown command signal and outputs the generated shutdown command signal to the signal generation unit 58.

In contrast, when the logic of the second signal Sg2 is set to H, the abnormality control unit 60 determines to perform the three-phase short-circuit control. In this case, the abnormality control unit 60 generates the three-phase short-circuit command signal and outputs the generated three-phase short-circuit command signal to the signal generation unit 58. Moreover, prior to outputting the three-phase short-circuit command signal to the signal generation unit 58, the abnormality control unit 60 performs the following control.

The abnormality control unit 60 determines, based on the d-axis and q-axis current values Idr and Iqr calculated by the dq conversion unit 53, whether the permanent magnets 34 of the rotor 33 will be demagnetized if the three-phase short-circuit control is performed. Specifically, the abnormality control unit 60 estimates a magnitude which the transient d-axis current will have if the three-phase short-circuit control is performed using association information (e.g., map information or formula information) associating the d-axis current value Idr and the q-axis current value Iqr with the magnitude of the transient d-axis current when the three-phase short-circuit control is performed. If the estimated magnitude of the transient d-axis current is higher than or equal to a demagnetization determination value, the abnormality control unit 60 determines that the permanent magnets 34 will be demagnetized. In contrast, if the estimated magnitude of the transient d-axis current is lower than the demagnetization determination value, the abnormality control unit 60 determines that the permanent magnets 34 will not be demagnetized. It should be noted that the association information and the demagnetization determination value may be set in advance according to the characteristics of the rotating electric machine 30.

The abnormality control unit 60 acquires the q-axis current value Iqr calculated by the dq conversion unit 53. Further, the abnormality control unit 60 determines the drive state of the rotating electric machine 30 on the basis of the acquired q-axis current value Iqr. Specifically, when the acquired q-axis current value Iqr is positive, the abnormality control unit 60 determines that the rotating electric machine 30 is in a power running drive state where it functions as an electric motor. In contrast, when the acquired q-axis current value Iqr is negative, the abnormality control unit 60 determines that the rotating electric machine 30 is in the regenerative drive state where it functions as an electric generator.

The abnormality control unit 60 generates the single-phase short-circuit command signal when it is determined that the permanent magnets 34 will be demagnetized and the rotating electric machine 30 is determined to be in the regenerative drive state. The switching pattern of the single-phase short-circuit control is set according to the states of the phase currents Iur, Ivr and Iwr described above. The abnormality control unit 60 outputs the single-phase short-circuit command signal to the signal generation unit 58 prior to outputting the three-phase short-circuit command signal.

The signal generation unit 58 generates, based on the single-phase short-circuit command signal, the gate signals so as to turn on one of the upper-arm and lower-arm switches QUH to QWH and QUL to QWL and turn off the remainder of the upper-arm and lower-arm switches QUH to QWH and QUL to QWL. Consequently, the single-phase short-circuit control is performed prior to execution of the three-phase short-circuit control.

Moreover, the abnormality control unit 60 counts (or measures) the duration of the single-phase short-circuit control from the start thereof. Further, when it is determined that the duration of the single-phase short-circuit control has reached a first set time Tj1, the abnormality control unit 60 outputs the three-phase short-circuit command signal to the signal generation unit 58. Consequently, the three-phase short-circuit control is performed after the single-phase short-circuit control is temporarily performed.

Otherwise, the abnormality control unit 60 generates the shutdown command signal when it is determined that the permanent magnets 34 will be demagnetized and the rotating electric machine 30 is determined to be in the power running drive state. Then, the abnormality control unit 60 outputs the shutdown command signal to the signal generation unit 58 prior to outputting the three-phase short-circuit command signal. Consequently, the shutdown control is performed prior to execution of the three-phase short-circuit control. Moreover, the abnormality control unit 60 counts (or measures) the duration of the shutdown control from the start thereof. Further, when it is determined that the duration of the shutdown control has reached a second set time Tj2, the abnormality control unit 60 outputs the three-phase short-circuit command signal to the signal generation unit 58. Consequently, the three-phase short-circuit control is performed after the shutdown control is temporarily performed. In addition, in the present embodiment, both the first and second set times Tj1 and Tj2 are preset in consideration of the characteristics of the rotating electric machine 30.

Figure 11:
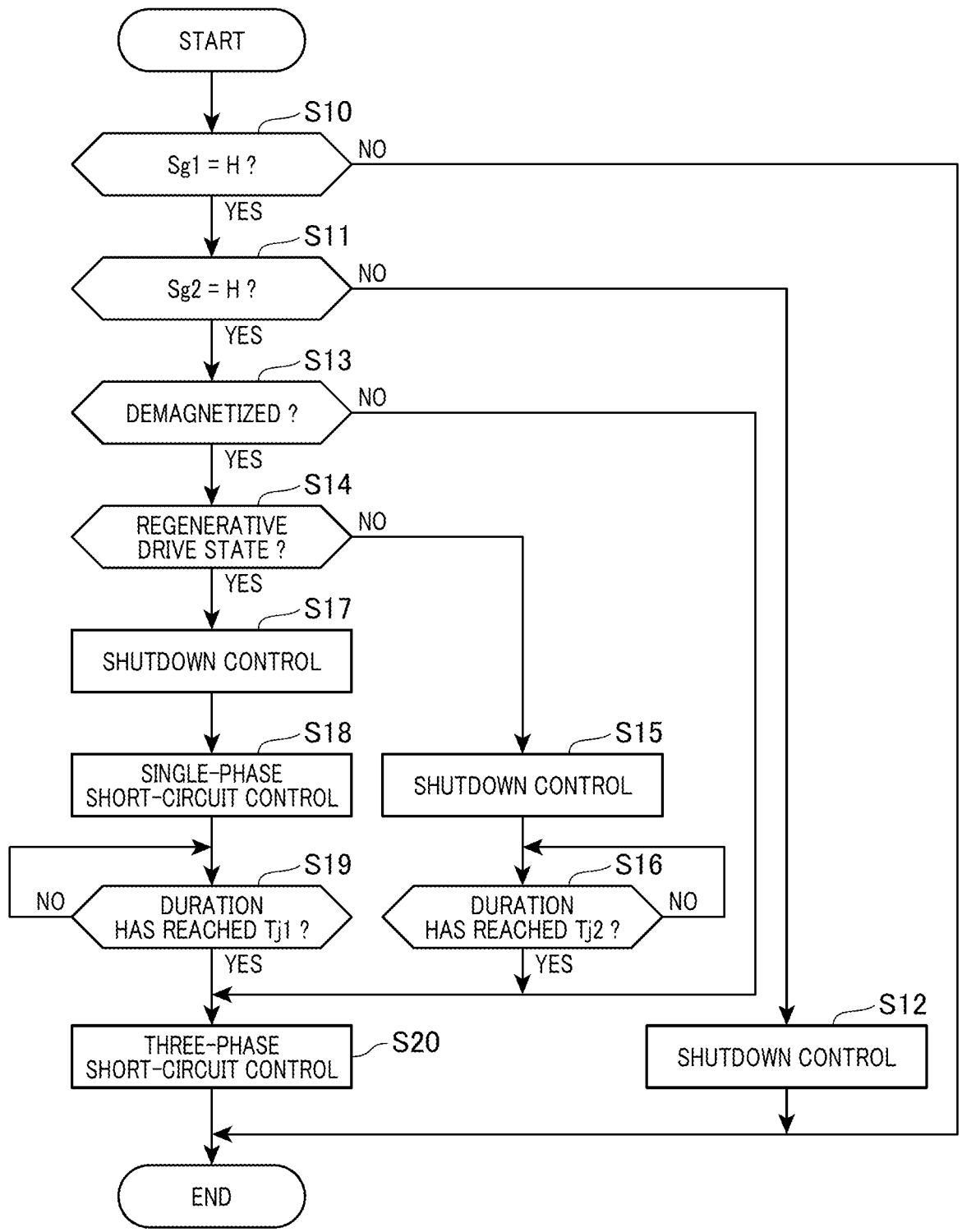
FIG. 11 is a flowchart illustrating steps of a control process performed by the control apparatus according to the first embodiment.

FIG. 11 illustrates steps of a control process performed by the control apparatus 50 according to the present embodiment. This control process is repeatedly performed at a predetermined cycle.

As shown in FIG. 11, in the control process, first, in step S10, the abnormality determination unit 59 determines whether the logic of the first signal Sg1 is H.

If the determination in step S10 results in a "NO" answer, i.e., if the logic of the first signal Sg1 is determined to be L, the abnormality determination unit 59 determines that no abnormality has occurred in the vehicle. Then, the control process is terminated.

In contrast, if the determination in step S10 results in a "YES" answer, i.e., if the logic of the first signal Sg1 is determined to be H, the abnormality determination unit 59 determines that an abnormality has occurred in the vehicle. In this case, the abnormality determination unit 59 further determines, based on the power supply voltage Vdc, whether the overvoltage abnormality has occurred in the smoothing capacitor 42. Then, the abnormality determination unit 59 generates the second signal Sg2 based on the result of the overvoltage abnormality determination, and outputs the generated second signal Sg2 to the abnormality control unit 60. Thereafter, the control process proceeds to step S11.

In step S11, the abnormality control unit 60 determines whether the logic of the second signal Sg2 is high. If the determination in step S11 results in a "NO" answer, i.e., if the logic of the second signal Sg2 is determined to be L, the abnormality control unit 60 determines that no overvoltage abnormality has occurred in the smoothing capacitor 42. Then, the control process proceeds to step S12. In contrast, if the determination in step S11 results in a "YES" answer, i.e., if the logic of the second signal Sg2 is determined to be H, the abnormality control unit 60 determines that the overvoltage abnormality has occurred in the smoothing capacitor 42. Then, the control process proceeds to step S13. In addition, in the present embodiment, step S11 corresponds to an "overvoltage determination unit".

In step S12, the abnormality control unit 60 generates the shutdown command signal and outputs the generated shutdown command signal to the signal generation unit 58. In response to receipt of the shutdown command signal, the signal generation unit 58 generates the gate signals so as to turn off all of the upper-arm and lower-arm switches QUH to QWH and QUL to QWL. Consequently, the shutdown control is performed. In addition, in the present embodiment, step S12 corresponds to a "shutdown control unit".

In step S13, the abnormality control unit 60 determines, based on the d-axis and q-axis current values Idr and Iqr calculated by the dq conversion unit 53, whether the permanent magnets 34 of the rotor 33 will be demagnetized if the three-phase short-circuit control is performed. If the determination in step S13 results in a "NO" answer, i.e., if it is determined by the abnormality control unit 60 that the permanent magnets 34 will not be demagnetized even if the three-phase short-circuit control is performed, the control process proceeds to step S20 without performing steps S14 to S19.

In step S20, the abnormality control unit 60 generates the three-phase short-circuit command signal and outputs the generated three-phase short-circuit command signal to the signal generation unit 58. In response to receipt of the three-phase short-circuit command signal, the signal generation unit 58 generates the gate signals so as to turn off all of the upper-arm switches QUH to QWH and turn on all of the lower-arm switches QUL to QWL. Consequently, the three-phase short-circuit control is performed. In addition, in the present embodiment, step S20 corresponds to an "all-phase short-circuiting unit".

On the other hand, if the determination in step S13 results in a "YES" answer, i.e., if it is determined by the abnormality control unit 60 that the permanent magnets 34 will be demagnetized if the three-phase short-circuit control is performed, the control process proceeds to step S14. In addition, in the present embodiment, step S13 corresponds to a "demagnetization determination unit".

In step S14, the abnormality control unit 60 acquires the q-axis current value Iqr calculated by the dq conversion unit 53. Then, based on the acquired q-axis current value Iqr, the abnormality control unit 60 determines whether the rotating electric machine 30 is in the regenerative drive state. If the determination in step S14 results in a "NO" answer, i.e., if the rotating electrical machine 30 is determined to be in the power running drive state, not in the regenerative drive state, the control process proceeds to step S15. In addition, in the present embodiment, step S14 corresponds to both a "drive state acquisition unit" and a "drive determination unit".

In step S15, the abnormality control unit 60 generates the shutdown command signal prior to generating the three-phase short-circuit command signal, and outputs the generated shutdown command signal to the signal generation unit 58. In response to receipt of the shutdown command signal, the signal generation unit 58 generates the gate signals so as to turn off all of the upper-arm and lower-arm switches QUH to QWH and QUL to QWL. Consequently, the shutdown control is performed.

In step S16, the abnormality control unit 60 determines whether the duration of the shutdown control from the start thereof has reached the second set time Tj2. If the determination in step S16 results in a "YES" answer, i.e., if the duration of the shutdown control is determined to have reached the second set time Tj2, the control process proceeds to step S20. That is, in the present embodiment, the shutdown control is continued only for the second set time Tj2, and then the three-phase short-circuit control is performed.

On the other hand, if the determination in step S14 results in a "YES" answer, i.e., if the rotating electrical machine 30 is determined to be in the regenerative drive state, the control process proceeds to step S17.

In step S17, the abnormality control unit 60 generates the shutdown command signal prior to generating the single-phase short-circuit command signal, and outputs the generated shutdown command signal to the signal generation unit 58. In response to receipt of the shutdown command signal, the signal generation unit 58 generates the gate signals so as to turn off all of the upper-arm and lower-arm switches QUH to QWH and QUL to QWL. Consequently, the shutdown control is temporarily performed.

In step S18, the abnormality control unit 60 generates the single-phase short-circuit command signal prior to generating the three-phase short-circuit command signal, and outputs the generated single-phase short-circuit command signal to the signal generation unit 58. In the present embodiment, the abnormality control unit 60 sets the switching pattern of the single-phase short-circuit control on the basis of the phase currents Iur, Ivr and Iwr. In response to receipt of the single-phase short-circuit command signal, the signal generation unit 58 generates the gate signals so as to turn on one of the upper-arm and lower-arm switches QUH to QWH and QUL to QWL and turn off the remainder of the upper-arm and lower-arm switches QUH to QWH and QUL to QWL. Consequently, the single-phase short-circuit control is performed. In addition, in the present embodiment, step S18 corresponds to a "single-phase short-circuiting unit".

In step S19, the abnormality control unit 60 determines whether the duration of the single-phase short-circuit control from the start thereof has reached the first set time Tj1. If the determination in step S19 results in a "YES" answer, i.e., if the duration of the single-phase short-circuit control is determined to have reached the first set time Tj1, the control process proceeds to step S20. That is, in the present embodiment, the single-phase short-circuit control is continued only for the first set time Tj1, and then the three-phase short-circuit control is performed.

Figure 12:
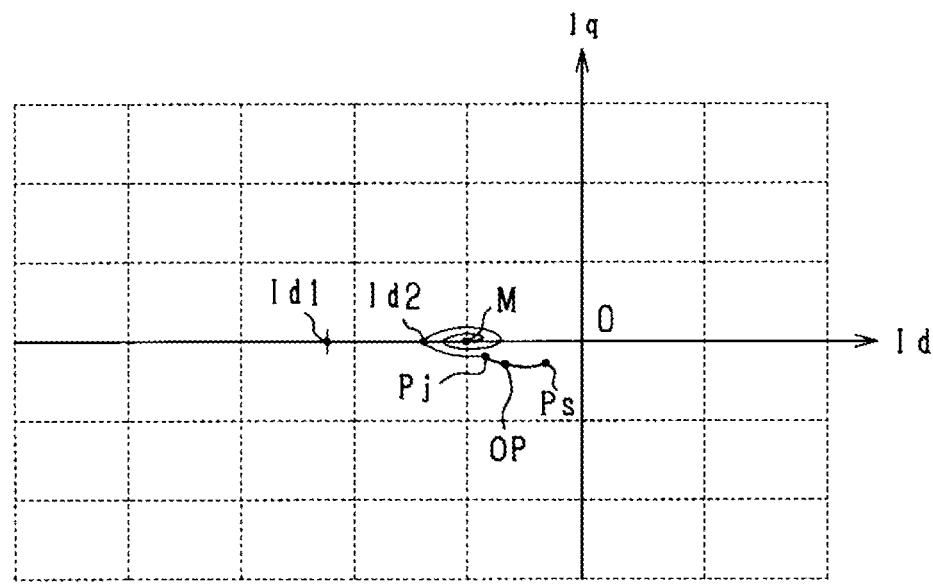
FIG. 12 is a diagram illustrating changes in the d-axis and q-axis currents when single-phase short-circuit control is performed prior to execution of the three-phase short-circuit control.

FIG. 12 illustrates an example of transition of the operating point OP when the single-phase short-circuit control is performed prior to execution of the three-phase short-circuit control. Specifically, the single-phase short-circuit control is performed during the movement of the operating point OP from the start point Ps to an intermediate point Pj; then the three-phase short-circuit control is performed during the movement of the operating point OP from the intermediate point Pj to the final arrival point M. In this case, the maximum value Id2 of the transient d-axis current in the negative direction according to the present embodiment is reduced as compared with the maximum value Id1 of the transient d-axis current in the negative direction according to the comparative example shown in FIG. 3.

In addition, if the single-phase short-circuit control is performed for an excessively long time, the maximum value of the d-axis current in the negative direction during execution of the single-phase short-circuit control may be increased as compared with the maximum value Id1 of the transient d-axis current in the negative direction according to the comparative example shown in FIG. 3. Therefore, in the present embodiment, the first set time Tj1 is set to a suitable length, thereby preventing the magnitude of the d-axis current during execution of the single-phase short-circuit control from being excessively increased.

According to the present embodiment described in detail above, it is possible to achieve the following advantageous effects.

In the present embodiment, in the case of the three-phase short-circuit control being performed when the rotating electric machine 30 is in the regenerative drive state, the single-phase short-circuit control is performed prior to execution of the three-phase short-circuit control. Consequently, closed circuits are formed in the rotating electric machine 30 and the switching device unit 41. As a result, flyback current flows through the closed circuits formed by the single-phase short-circuit control, thereby making it possible to cause the operating point OP to move to a point where the magnitude of the transient d-axis current in the negative direction is reduced. Therefore, when the three-phase short-circuit is performed, the magnitude of the transient d-axis current in the negative direction is reduced, thereby making it possible to suppress demagnetization of the permanent magnets 34. As above, according to the present embodiment, it becomes possible to suppress demagnetization of the permanent magnets 34 by temporarily performing the single-phase short-circuit control prior to execution of the three-phase short-circuit control.

The single-phase short-circuit control is a control of turning on one of the upper-arm and lower-arm switches QUH to QWH and QUL to QWL according to the states of the phase currents Iur, Ivr and Iwr and turning off the remainder of the upper-arm and lower-arm switches QUH to QWH and QUL to QWL. Therefore, by performing the single-phase short-circuit, it is possible to reliably form the closed circuits in the rotating electric machine 30 and the switching device unit 41.

The phase currents Iur, Ivr and Iwr detected by the phase current detection unit 43 are originally used for the power running drive control or the regenerative drive control. In the present embodiment, that one of the upper-arm and lower-arm switches QUH to QWH and QUL to QWL which is to be turned on in the single-phase short-circuit control is selected based on the phase currents Iur, Ivr and Iwr. Consequently, it becomes possible to perform the single-phase short-circuit control by utilizing the phase currents Iur, Ivr and Iwr originally used for the power running drive control or the regenerative drive control.

If the duration of the single-phase short-circuit control is excessively short, the magnitude of the transient d-axis current may not be sufficiently reduced. On the other hand, if the duration of the single-phase short-circuit control is excessively long, the magnitude of the d-axis current may be increased. That is, if the duration of the single-phase short-circuit control is not suitably set, the permanent magnets 34 may become demagnetized.

Therefore, in the present embodiment, the three-phase short-circuit control is performed on condition that the duration of the single-phase short-circuit control has reached the first set time Tj1. Consequently, it becomes possible to suitably set the duration of the single-phase short-circuit control, thereby reliably suppressing the magnitude of the transient d-axis current. As a result, demagnetization of the permanent magnets 34 can be reliably suppressed.

In the present embodiment, a preset time is used as the first set time Tj1. Consequently, the single-phase short-circuit control can be easily performed without setting the first set time Tj1 according to the situation each time the single-phase short-circuit control is performed.

In the present embodiment, the single-phase short-circuit control is performed on condition that it is determined that demagnetization of the permanent magnets 34 of the rotor 33 will occur if the three-phase short-circuit control is performed. Therefore, when it is determined that demagnetization of the permanent magnets 34 will not occur, the three-phase short-circuit control will be promptly performed without performing the single-phase short-circuit control. As a result, it becomes possible to simplify the control process until execution of the three-phase short-circuit control while suppressing demagnetization of the permanent magnets 34.

In the present embodiment, the three-phase short-circuit control is performed on condition that it is determined that the overvoltage abnormality has occurred in the smoothing capacitor 42. Therefore, when it is determined that no overvoltage abnormality has occurred in the smoothing capacitor 42, the three-phase short-circuit control will not be performed. As a result, the chance of the permanent magnets 34 being demagnetized by execution of the three-phase short-circuit control can be reduced.

In the present embodiment, the determination as to whether the rotating electric machine 30 is in the regenerative drive state is made based on the q-axis current value Iqr calculated by the dq conversion unit 53. Therefore, it is possible to reliably determine whether the rotating electric machine 30 is in the regenerative drive state in which the single-phase short-circuit control is to be performed.

In the present embodiment, when the rotating electric machine 30 is determined to be in the power running drive state, the shutdown control is temporarily performed prior to execution of the three-phase short-circuit control. Consequently, the supply of electric power from the switching device unit 41 to the rotating electric machine 30 is stopped, thereby making it possible to cause the operating point OP to move to a point where the transient d-axis current is reduced. As a result, demagnetization of the permanent magnets 34 can be suppressed.

In the present embodiment, the shutdown control is temporarily performed prior to execution of the single-phase short-circuit control. Consequently, it becomes possible to prevent the positive-electrode-side bus Lp and the negative-electrode-side bus Ln from being short-circuited.

Second Embodiment

Hereinafter, a second embodiment will be described with reference to FIGS. 13 to 19, focusing on the differences thereof from the first embodiment.

In the present embodiment, the switching pattern of the single-phase short-circuit control is selected according to the states of the line-to-line voltages Vuv, Vvw and Vwu, not according to the states of the phase currents Iur, Ivr and Iwr as in the first embodiment.

Figure 13:
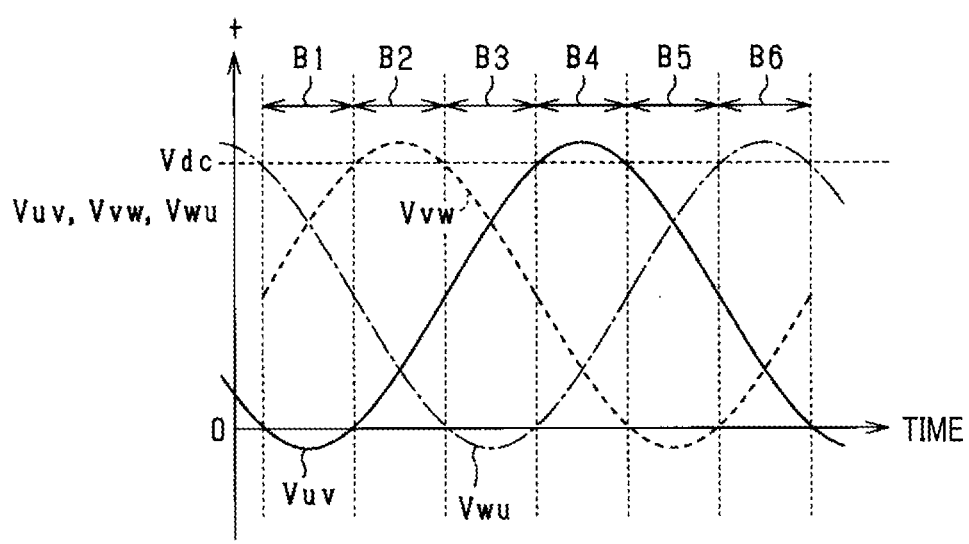
FIG. 13 is a diagram illustrating an example of waveforms of line-to-line voltages according to a second embodiment.

FIG. 13 illustrates an example of the waveforms of the line-to-line voltages Vuv, Vvw and Vwu detected by the line-to-line voltage detection unit 46 in the regenerative drive state of the rotating electric machine 30. In FIG. 13, the solid line represents the waveform of the U-V-phases line-to-line voltage Vuv; the dashed line represents the waveform of the V-W-phases line-to-line voltage Vvw; and the chain line represents the waveform of the W-U-phases line-to-line voltage Vwu.

The states of the line-to-line voltages Vuv, Vvw and Vwu can be classified into first to sixth voltage patterns B1 to B6. Specifically, in the first voltage pattern B1, the U-V-phases line-to-line voltage Vuv is lower than the reference voltage (i.e., 0V in the present embodiment). In the second voltage pattern B2, the V-W-phases line-to-line voltage Vvw is higher than the power supply voltage Vdc. In the third voltage pattern B3, the W-U-phases line-to-line voltage Vwu is lower than the reference voltage. In the fourth voltage pattern B4, the U-V-phases line-to-line voltage Vuv is higher than the power supply voltage Vdc. In the fifth voltage pattern B5, the V-W-phases line-to-line voltage Vvw is lower than the reference voltage. In the sixth voltage pattern B6, the W-U-phases line-to-line voltage Vwu is higher than the power supply voltage Vdc. In addition, as described above, the power supply voltage Vdc is detected by the DC voltage detection unit 45.

In performing the single-phase short-circuit control, when one of the line-to-line voltages Vuv, Vvw and Vwu is lower than the reference voltage, the abnormality control unit 60 first selects, of the two phases between which the line-to-line voltage lower than the reference voltage is defined, the phase in which electric current is flowing through the lower-arm diode. Then, the abnormality control unit 60 turns on the upper-arm switch of the selected phase and turns off the lower-arm switch of the selected phase. Moreover, the abnormality control unit 60 turns off all of the upper-arm and lower-arm switches of the other phases of the switching device unit 41 than the selected phase. On the other hand, when one of the line-to-line voltages Vuv, Vvw and Vwu is higher than the power supply voltage Vdc, the abnormality control unit 60 first selects, of the two phases between which the line-to-line voltage higher than the power supply voltage Vdc is defined, the phase in which electric current is flowing through the upper-arm diode. Then, the abnormality control unit 60 turns on the lower-arm switch of the selected phase and turns off the upper-arm switch of the selected phase. Moreover, the abnormality control unit 60 turns off all of the upper-arm and lower-arm switches of the other phases of the switching device unit 41 than the selected phase.

FIGS. 14 to 19 are diagrams illustrating the paths of electric current flowing through the control system 10 in the voltage patterns B1 to B6. It should be noted that: those of the components shown in FIG. 1 which are not used for the following explanation are omitted from FIGS. 14 to 19; and identical components in FIG. 1 and FIGS. 14 to 19 are designated by the same reference numerals.

Figure 14:
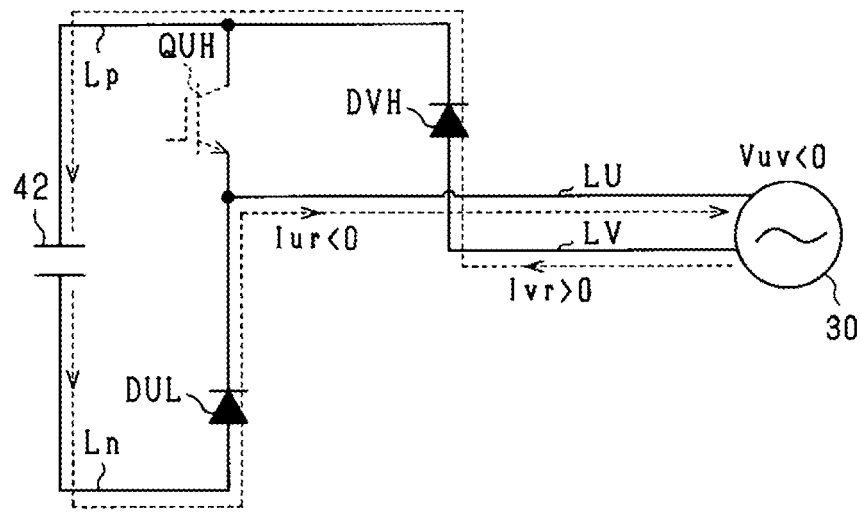
FIG. 14 is a diagram illustrating an electric current path in a first voltage pattern.

FIG. 14 illustrates the electric current path in the first voltage pattern B1. In this voltage pattern, since the U-V-phases line-to-line voltage Vuv is lower than the reference voltage, electric current flows in a direction in which the U-phase current Iur becomes negative. Specifically, in the first voltage pattern B1, electric current flows along the path of: the smoothing capacitor 42→the negative-electrode-side bus Ln→the U-phase lower-arm diode DUL→the U-phase conductive member LU→the rotating electric machine 30→the V-phase conductive member LV→the V-phase upper-arm diode DVH→the positive-electrode-side bus Lp→the smoothing capacitor 42. In this case, of the U and V phases between which the line-to-line voltage Vuv lower than the reference voltage is defined, the abnormality control unit 60 selects the U phase in which electric current is flowing through the lower-arm diode DUL. Then, the abnormality control unit 60 turns on the U-phase upper-arm switch QUH (i.e., the upper-arm switch of the selected phase) and turns off the U-phase lower-arm switch QUL (i.e., the lower-arm switch of the selected phase). Consequently, a closed circuit is formed which includes the U-phase upper-arm switch QUH, the V-phase upper-arm diode DVH and the rotating electric machine 30.

Figure 15:
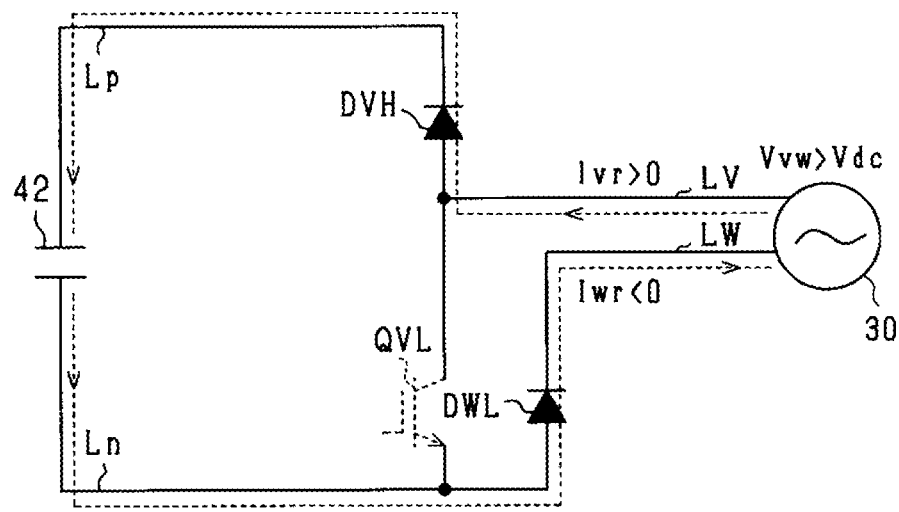
FIG. 15 is a diagram illustrating an electric current path in a second voltage pattern.

FIG. 15 illustrates the electric current path in the second voltage pattern B2. In this voltage pattern, since the V-W-phases line-to-line voltage Vvw is higher than the power supply voltage Vdc, electric current flows in a direction in which the V-phase current Ivr becomes positive. Specifically, in the second voltage pattern B2, electric current flows along the path of: the smoothing capacitor 42→the negative-electrode-side bus Ln→the W-phase lower-arm diode DWL→the W-phase conductive member LW→the rotating electric machine 30→the V-phase conductive member LV→the V-phase upper-arm diode DVH→the positive-electrode-side bus Lp→the smoothing capacitor 42. In this case, of the V and W phases between which the line-to-line voltage Vvw higher than the power supply voltage Vdc is defined, the abnormality control unit 60 selects the V phase in which electric current is flowing through the upper-arm diode DVH. Then, the abnormality control unit 60 turns on the V-phase lower-arm switch QVL (i.e., the lower-arm switch of the selected phase) and turns off the V-phase upper-arm switch QVH (i.e., the upper-arm switch of the selected phase). Consequently, a closed circuit is formed which includes the V-phase lower-arm switch QVL, the W-phase lower-arm diode DWL and the rotating electric machine 30.

Figure 16:
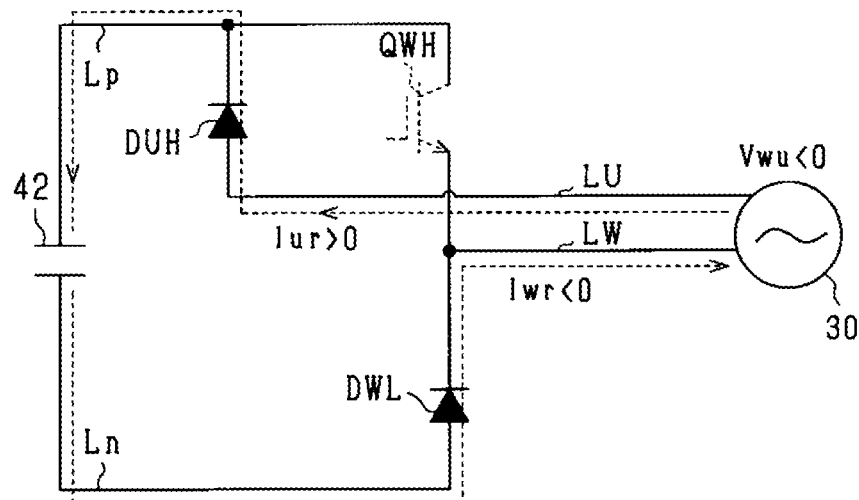
FIG. 16 is a diagram illustrating an electric current path in a third voltage pattern.

FIG. 16 illustrates the electric current path in the third voltage pattern B3. In this voltage pattern, since the W-U- phases line-to-line voltage Vwu is lower than the reference voltage, electric current flows in a direction in which the W-phase current Iwr becomes negative. Specifically, in the third voltage pattern B3, electric current flows along the path of: the smoothing capacitor 42→the negative-electrode-side bus Ln→the W-phase lower-arm diode DWL→the W-phase conductive member LW→the rotating electric machine 30→the U-phase conductive member LU→the U-phase upper-arm diode DUH→the positive-electrode-side bus Lp→the smoothing capacitor 42. In this case, of the W and U phases between which the line-to-line voltage Vwu lower than the reference voltage is defined, the abnormality control unit 60 selects the W phase in which electric current is flowing through the lower-arm diode DWL. Then, the abnormality control unit 60 turns on the W-phase upper-arm switch QWH (i.e., the upper-arm switch of the selected phase) and turns off the W-phase lower-arm switch QWL (i.e., the lower-arm switch of the selected phase). Consequently, a closed circuit is formed which includes the W-phase upper-arm switch QWH, the U-phase upper-arm diode DUH and the rotating electric machine 30.

Figure 17:
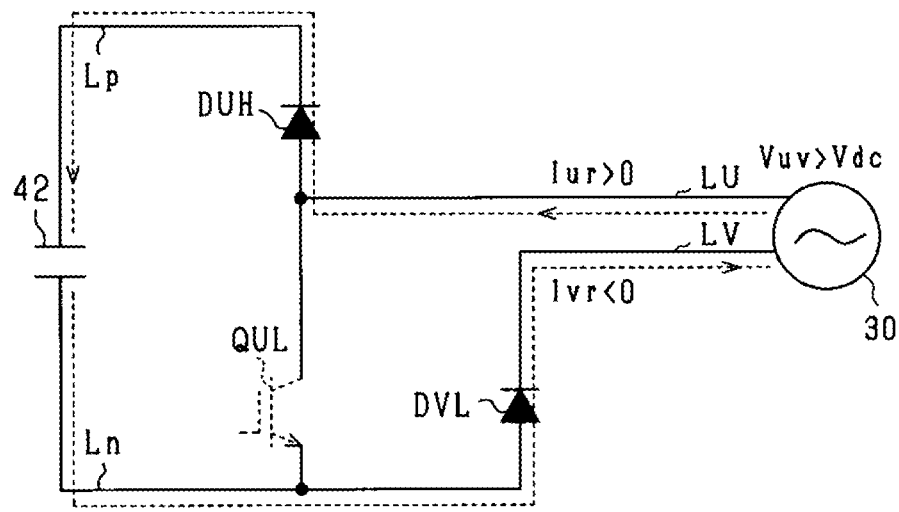
FIG. 17 is a diagram illustrating an electric current path in a fourth voltage pattern.

FIG. 17 illustrates the electric current path in the fourth voltage pattern B4. In this voltage pattern, since the U-V-phases line-to-line voltage Vuv is higher than the power supply voltage Vdc, electric current flows in a direction in which the U-phase current Iur becomes positive. Specifically, in the fourth voltage pattern B4, electric current flows along the path of: the smoothing capacitor 42→the negative-electrode-side bus Ln→the V-phase lower-arm diode DVL→the V-phase conductive member LV→the rotating electric machine 30→the U-phase conductive member LU→the U-phase upper-arm diode DUH→the positive-electrode-side bus Lp→the smoothing capacitor 42. In this case, of the U and V phases between which the line-to-line voltage Vuv higher than the power supply voltage Vdc is defined, the abnormality control unit 60 selects the U phase in which electric current is flowing through the upper-arm diode DUH. Then, the abnormality control unit 60 turns on the U-phase lower-arm switch QUL (i.e., the lower-arm switch of the selected phase) and turns off the U-phase upper-arm switch QUH (i.e., the upper-arm switch of the selected phase). Consequently, a closed circuit is formed which includes the U-phase lower-arm switch QUL, the V-phase lower-arm diode DVL and the rotating electric machine 30.

Figure 18:
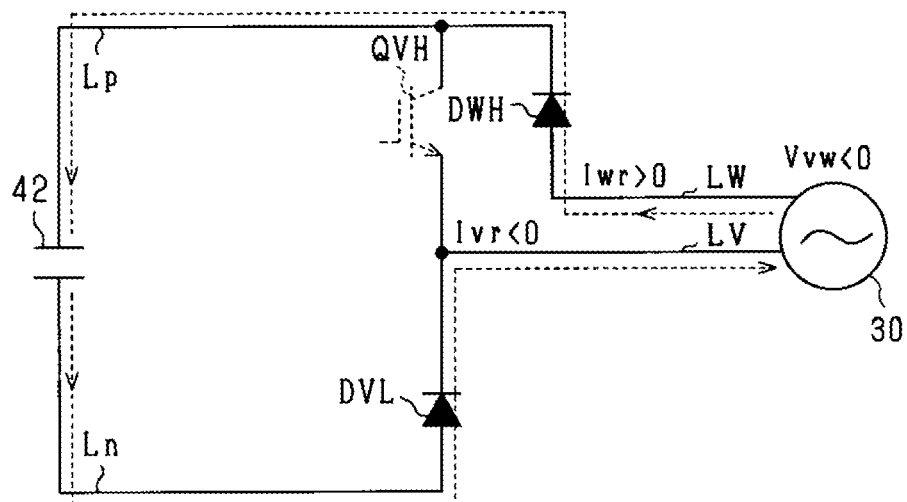
FIG. 18 is a diagram illustrating an electric current path in a fifth voltage pattern.

FIG. 18 illustrates the electric current path in the fifth voltage pattern B5. In this voltage pattern, since the V-W-phases line-to-line voltage Vvw is lower than the reference voltage, electric current flows in a direction in which the V-phase current Ivr becomes negative. Specifically, in the fifth voltage pattern B5, electric current flows along the path of: the smoothing capacitor 42→the negative-electrode-side bus Ln→the V-phase lower-arm diode DVL→the V-phase conductive member LV→the rotating electric machine 30→the W-phase conductive member LW→the W-phase upper-arm diode DWH→the positive-electrode-side bus Lp→the smoothing capacitor 42. In this case, of the V and W phases between which the line-to-line voltage Vvw lower than the reference voltage is defined, the abnormality control unit 60 selects the V phase in which electric current is flowing through the lower-arm diode DVL. Then, the abnormality control unit 60 turns on the V-phase upper-arm switch QVH (i.e., the upper-arm switch of the selected phase) and turns off the V-phase lower-arm switch QVL (i.e., the lower-arm switch of the selected phase). Consequently, a closed circuit is formed which includes the V-phase upper-arm switch QVH, the W-phase upper-arm diode DWH and the rotating electric machine 30.

Figure 19:
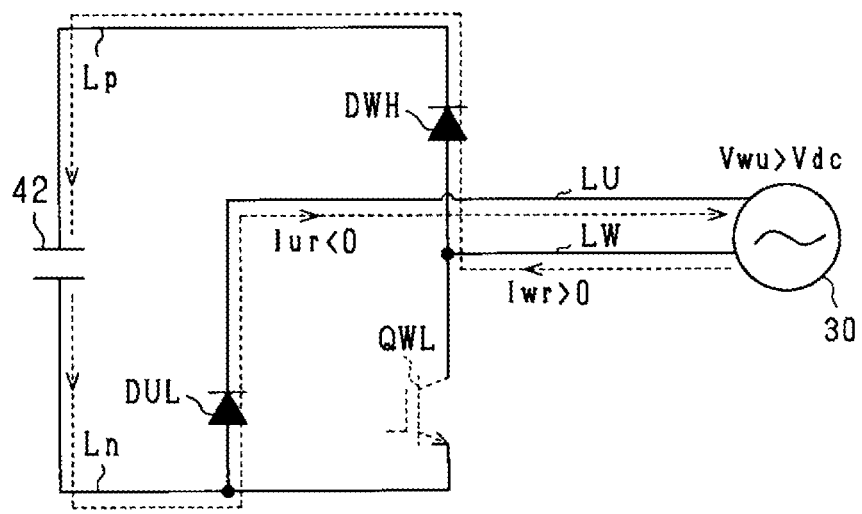
FIG. 19 is a diagram illustrating an electric current path in a sixth voltage pattern.

FIG. 19 illustrates the electric current path in the sixth voltage pattern B6. In this voltage pattern, since the W-U-phases line-to-line voltage Vwu is higher than the power supply voltage Vdc, electric current flows in a direction in which the W-phase current Iwr becomes positive. Specifically, in the sixth voltage pattern B6, electric current flows along the path of: the smoothing capacitor 42→the negative-electrode-side bus Ln→the U-phase lower-arm diode DUL→the U-phase conductive member LU→the rotating electric machine 30→the W-phase conductive member LW→the W-phase upper-arm diode DWH→the positive-electrode-side bus Lp→the smoothing capacitor 42. In this case, of the W and U phases between which the line-to-line voltage Vwu higher than the power supply voltage Vdc is defined, the abnormality control unit 60 selects the W phase in which electric current is flowing through the upper-arm diode DWH. Then, the abnormality control unit 60 turns on the W-phase lower-arm switch QWL (i.e., the lower-arm switch of the selected phase) and turns off the W-phase upper-arm switch QWH (i.e., the upper-arm switch of the selected phase). Consequently, a closed circuit is formed which includes the W-phase lower-arm switch QWL, the U-phase lower-arm diode DUL and the rotating electric machine 30.

As described above, in the present embodiment, the switching pattern of the single-phase short-circuit control is selected according to the states of the line-to-line voltages Vuv, Vvw and Vwu. Consequently, it becomes possible to suitably select the switching pattern of the single-phase short-circuit control as in the first embodiment.

Third Embodiment

Hereinafter, a third embodiment will be described with reference to FIG. 20, focusing on the differences thereof from the first embodiment.

In the present embodiment, the first and second set times Tj1 and Tj2 are calculated based on the d-axis current value Idr and the q-axis current value Iqr, instead of using preset times as the first and second set times Tj1 and Tj2 as in the first embodiment.

Figure 20:
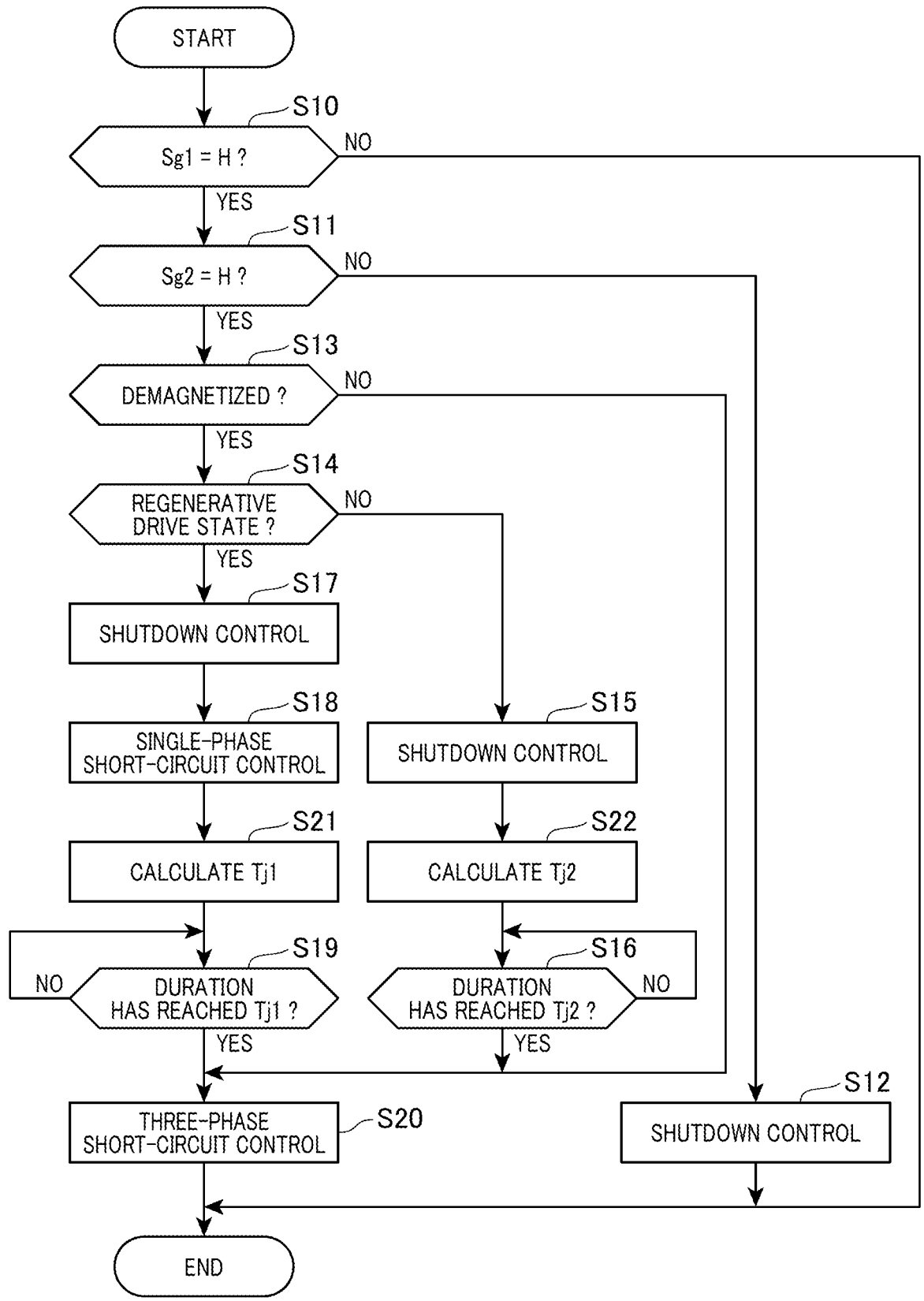
FIG. 20 is a flowchart illustrating steps of a control process performed by a control apparatus according to a third embodiment.

FIG. 20 illustrates steps of a control process performed by the control apparatus 50 according to the present embodiment.

As shown in FIG. 20, in the control process according to the present embodiment, in step S21 after step S18, the abnormality control unit 60 calculates, based on the d-axis current value Idr and the q-axis current value Iqr, the first set time Tj1 as a set time during which the magnitude of the transient d-axis current becomes lower than the demagnetization determination value due to execution of the single-phase short-circuit control in step S18. Specifically, the abnormality control unit 60 calculates the first set time Tj1 using association information (e.g., map information or formula information) associating the d-axis current value Idr and the q-axis current value Iqr with the first set time Tj1. Then, in step S19, the abnormality control unit 60 determines whether the duration of the single-phase short-circuit control has reached the first set time Tj1 calculated in step S21. In addition, in the present embodiment, step S21 corresponds to a "time calculation unit".

Moreover, in the control process according to the present embodiment, in step S22 after step S15, the abnormality control unit 60 calculates, based on the d-axis current value Idr and the q-axis current value Iqr, the second set time Tj2 as a set time during which the magnitude of the transient d-axis current becomes lower than the demagnetization determination value due to execution of the shutdown control in step S15. Specifically, the abnormality control unit 60 calculates the second set time Tj2 using association information (e.g., map information or formula information) associating the d-axis current value Idr and the q-axis current value Iqr with the second set time Tj2. Then, in step S16, the abnormality control unit 60 determines whether the duration of the shutdown control has reached the second set time Tj2 calculated in step S22.

As described above, in the present embodiment, the first and second set times Tj1 and Tj2 are calculated based on the d-axis current value Idr and the q-axis current value Iqr. Consequently, it becomes possible to suitably set the duration of the single-phase short-circuit control for suppressing demagnetization of the permanent magnets 34.

Fourth Embodiment

Hereinafter, a fourth embodiment will be described with reference to FIG. 21, focusing on the differences thereof from the first embodiment.

In the present embodiment, the abnormality control unit 60 determines whether a magnitude which the transient d-axis current in the negative direction will have if the three-phase short-circuit control is performed is within a range in which no demagnetization of the permanent magnets 34 occurs, instead of determining whether the duration of the single-phase short-circuit control has reached a set time as in the first embodiment.

Figure 21:
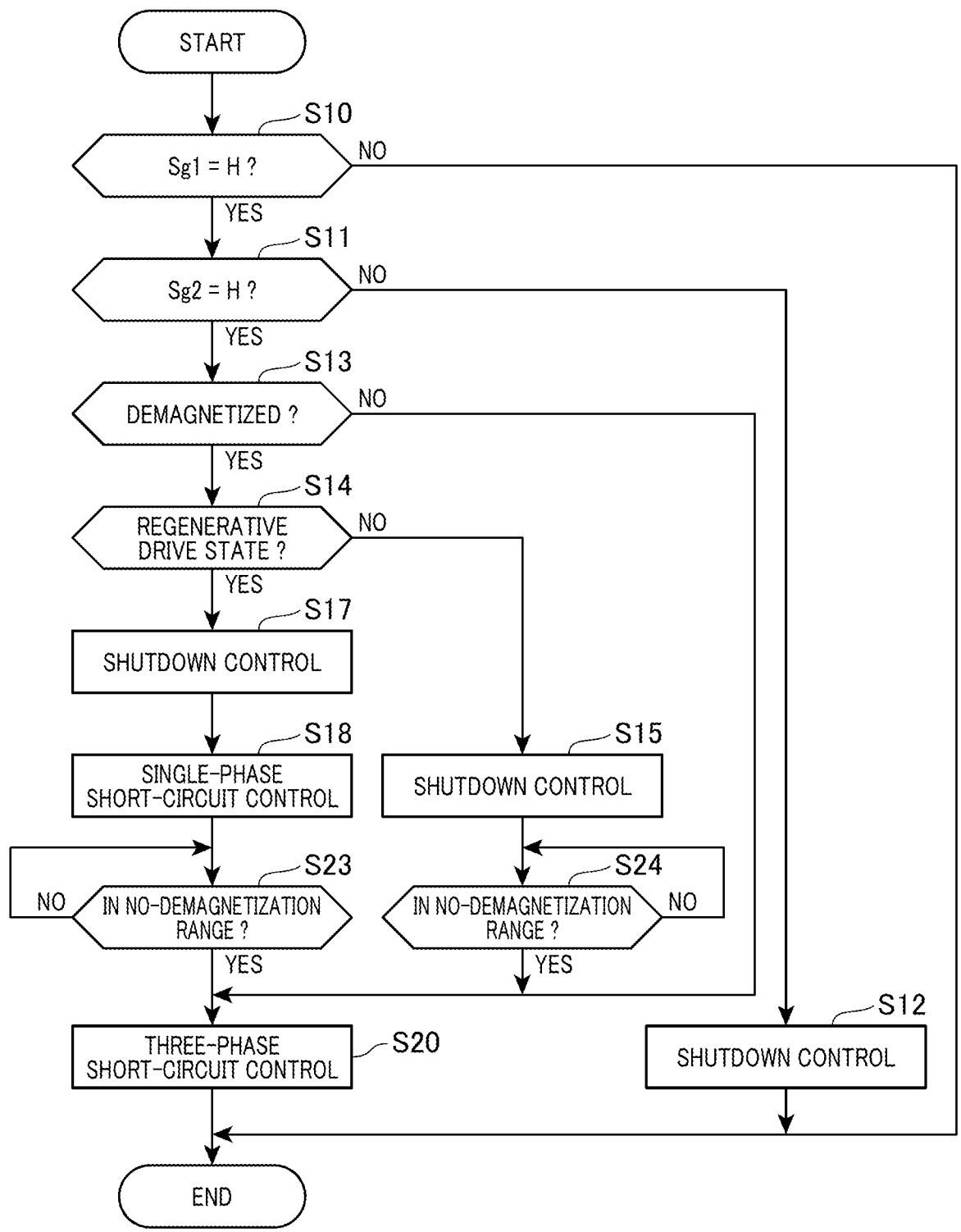
FIG. 21 is a flowchart illustrating steps of a control process performed by a control apparatus according to a fourth embodiment.

FIG. 21 illustrates steps of a control process performed by the control apparatus 50 according to the present embodiment.

As shown in FIG. 21, the control process according to the present embodiment includes step S23 instead of step S19 (see FIG. 11) included in the control process according to the first embodiment. In step S23, the abnormality control unit 60 first estimates, based on the d-axis current value Idr and the q-axis current value Iqr during execution of the single-phase short-circuit control, a magnitude which the transient d-axis current in the negative direction will have if the three-phase short-circuit control is performed. Then, the abnormality control unit 60 determines whether the estimated magnitude of the transient d-axis current in the negative direction is within the range in which no demagnetization of the permanent magnets 34 occurs. Specifically, if the estimated magnitude of the transient d-axis current in the negative direction is higher than or equal to the demagnetization determination value, the abnormality control unit 60 determines that it is within a range in which demagnetization of the permanent magnets 34 occurs. In contrast, if the estimated magnitude of the transient d-axis current in the negative direction is lower than the demagnetization determination value, the abnormality control unit 60 determines that it is within the range in which no demagnetization of the permanent magnets 34 occurs. In addition, in the present embodiment, step S23 corresponds to an "execution determination unit".

Moreover, the control process according to the present embodiment includes step S24 instead of step S16 (see FIG. 11) included in the control process according to the first embodiment. Since step S24 is similar to step S23, explanation of step S24 is omitted hereinafter.

As described above, in the present embodiment, the abnormality control unit 60 determines, based on the d-axis current value Idr and the q-axis current value Iqr during execution of the single-phase short-circuit control, whether a magnitude which the transient d-axis current in the negative direction will have if the three-phase short-circuit control is performed is within the range in which no demagnetization of the permanent magnets 34 occurs. Moreover, the abnormality control unit 60 performs the three-phase short-circuit control on condition that the result of the determination is affirmative. Consequently, it becomes possible to continue the single-phase short-circuit control until the operating point OP moves to an operating point where no demagnetization of the permanent magnets 34 will occur if the three-phase short-circuit control is performed. As a result, demagnetization of the permanent magnets 34 can be reliably suppressed.

Fifth Embodiment

Hereinafter, a fifth embodiment will be described with reference to FIG. 22, focusing on the differences thereof from the first embodiment.

In the present embodiment, the abnormality control unit 60 determines whether the q-axis current value Iqr during execution of the single-phase short-circuit control has been reduced to zero, instead of determining whether the duration of the single-phase short-circuit control has reached a set time as in the first embodiment.

Figure 22:
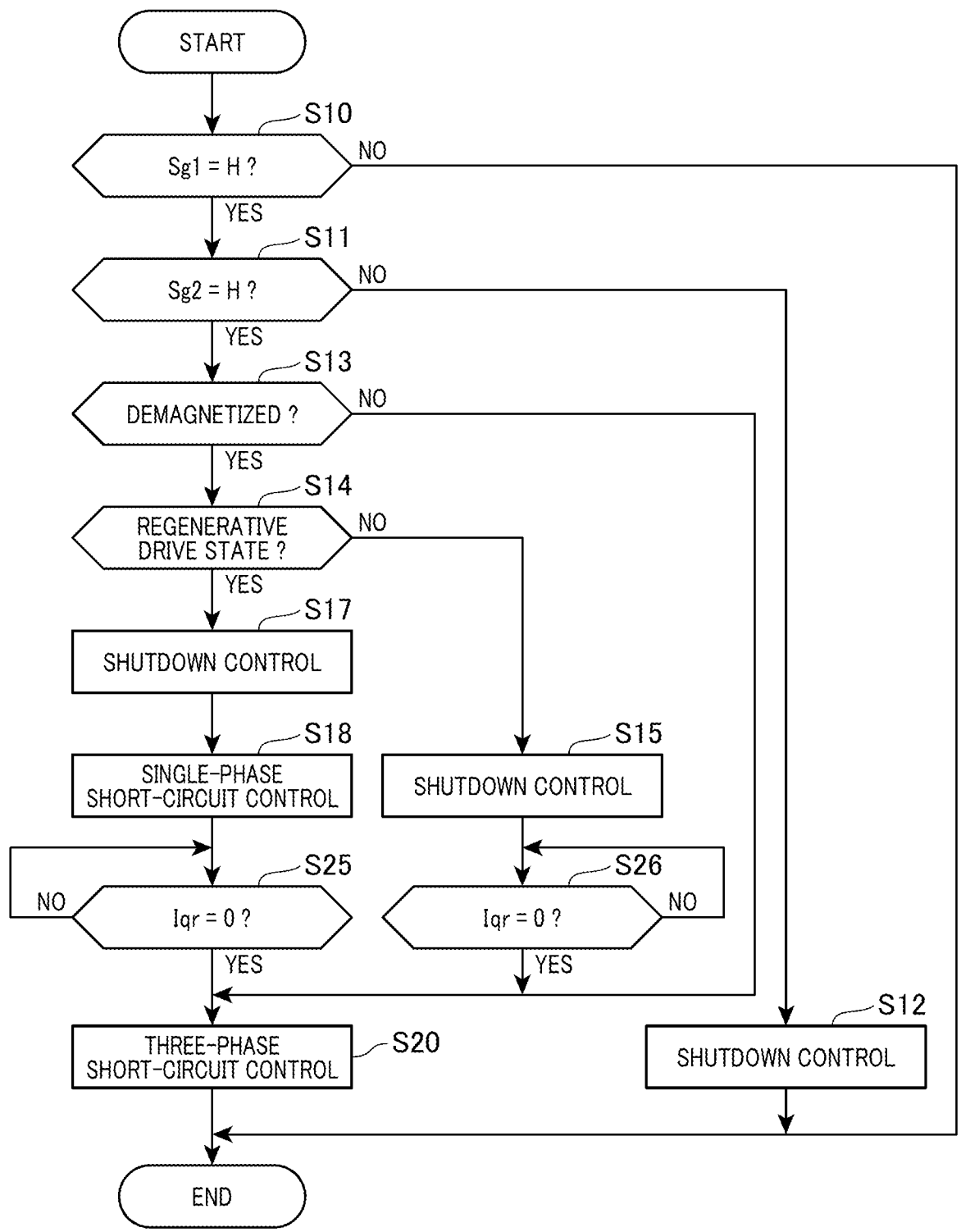
FIG. 22 is a flowchart illustrating steps of a control process performed by a control apparatus according to a fifth embodiment.

FIG. 22 illustrates steps of a control process performed by the control apparatus 50 according to the present embodiment.

As shown in FIG. 22, the control process according to the present embodiment includes step S25 instead of step S19 (see FIG. 11) included in the control process according to the first embodiment. In step S25, the abnormality control unit 60 determines whether the q-axis current value Iqr during execution of the single-phase short-circuit control has been reduced to zero. In addition, in the present embodiment, step S25 corresponds to the "execution determination unit".

Moreover, the control process according to the present embodiment includes step S26 instead of step S16 (see FIG. 11) included in the control process according to the first embodiment. Since step S26 is similar to step S25, explanation of step S26 is omitted hereinafter.

As described above, in the present embodiment, the abnormality control unit 60 determines whether the q-axis current value Iqr during execution of the single-phase short-circuit control has been reduced to zero. Moreover, the abnormality control unit 60 performs the three-phase short-circuit control on condition that the result of the determination is affirmative. It has been known that the lower the magnitude of the q-axis current value Iqr prior to execution of the three-phase short-circuit control, the more the transient d-axis current is reduced. Therefore, by performing the three-phase short-circuit control in a state of the q-axis current value Iqr having become 0, it is possible to reduce the transient d-axis current, thereby suppressing demagnetization of the permanent magnets 34.

Other Embodiments

The above-described embodiments can be modified and implemented as follows. Moreover, the above-described embodiments and the following modifications can also be implemented in combination with each other to the extent that there is no technical contradiction between them.

In the above-described embodiments, the three-phase short-circuit control is performed by turning off all of the upper-arm switches QUH to QWH and turning on all of the lower-arm switches QUL to QWL. Alternatively, the three-phase short-circuit control may alternatively be performed by turning on all of the upper-arm switches QUH to QWH and turning off all of the lower-arm switches QUL to QWL. That is, all of the upper-arm switches QUH to QWH together constitute an upper-arm switch group while all of the lower-arm switches QUL to QWL together constitute a lower-arm switch group; the three-phase short-circuit control may be performed by turning on all of the switches of one of the upper-arm switch group and the lower-arm switch group and turning off all of the switches of the other of the upper-arm switch group and the lower-arm switch group.

In the above-described first embodiment, when the logic of the first signal Sg1 inputted from the superordinate control apparatus 70 is set to H, the abnormality determination unit 59 determines whether the power supply voltage Vdc is higher than the overvoltage threshold Vj. Alternatively, the abnormality determination unit 59 may make the determination regardless of the logic of the first signal Sg1. Moreover, in the above-described embodiments, the abnormality determination unit 59 sets the logic of the second signal Sg2 to H or L depending on the result of the determination as to whether the power supply voltage Vdc is higher than the overvoltage threshold Vj; and the abnormality control unit 60 performs steps S13 to S20 of the control process according to the logic of the second signal Sg2 inputted from the abnormality determination unit 59. Alternatively, when the power supply voltage Vdc is determined by the abnormality determination unit 59 to be higher than the overvoltage threshold Vj, the abnormality control unit 60 may perform steps S13 to S20 of the control process regardless of the logic of the second signal Sg2 inputted from the abnormality determination unit 59. That is, steps 10 and 11 may be omitted from the control process.

For example, a load dump may occur during the power running drive control of the rotating electric machine 30, thereby causing the overvoltage abnormality to occur. Here, the load dump is a phenomenon in which the rotating electric machine 30 is disconnected from the storage battery 20 due to, for example, the first cutoff switch Sp being unintentionally turned off; and the overvoltage abnormality is an abnormality in which the power supply voltage Vdc rises suddenly. In this case, with the above modification, the determination as to whether the overvoltage abnormality has occurred can be made without intervention from the superordinate control apparatus 70; consequently, execution of the three-phase short-circuit control can be immediately started.

In the above-described first embodiment, the switching pattern of the single-phase short-circuit control is selected according to the states of the phase currents Iur, Ivr and Iwr. Alternatively, the switching pattern of the single-phase short-circuit control may be selected based on the electrical angle θe detected by the angle detection unit 44.

Step S17 (see FIG. 11) may be omitted from the control process according to the above-described first embodiment.

In the above-described first embodiment, each of the upper-arm and lower-arm switches QUH to QWH and QUL to QWL of the inverter 40 is configured with an IGBT. Alternatively, each of the upper-arm and lower-arm switches QUH to QWH and QUL to QWL of the inverter 40 may be configured with, for example, an N-channel MOSFET (Metal-Oxide-Semiconductor Field-Effect Transistor) having a body diode built therein.

In the above-described first embodiment, the number of phases of the rotating electric machine 30 and the inverter 40 is three. Alternatively, the number of phases of the rotating electric machine 30 and the inverter 40 may be two, or four or more. In addition, the rotating electric machine 30 is not limited to an on-board motor, but may be an in-wheel motor that is built in a vehicle wheel.

In the above-described first embodiment, the U-phase, V-phase and W-phase coils 31U, 31V and 31W of the rotating electric machine 30 are star-connected. Alternatively, the U-phase, V-phase and W-phase coils 31U, 31V and 31W may be delta-connected together.

In the above-described fifth embodiment, in steps S25 and S26 of the control process (see FIG. 22), the abnormality control unit 60 determines whether the q-axis current value Iqr during execution of the single-phase short-circuit control has been reduced to zero. Alternatively, the abnormality control unit 60 may determine whether the q-axis current value Iqr during execution of the single-phase short-circuit control has been reduced to a current determination value that is slightly greater than zero. Here, the current determination value may be any value with which it is possible to determine whether the q-axis current value Iqr during execution of the single-phase short-circuit control has been reduced to become less than the q-axis current value Iqr prior to the execution of the single-phase short-circuit control.

In the above-described fifth embodiment, the control system 10 is installed in a vehicle. Alternatively, the control system 10 may be installed in other mobile objects, such as an aircraft or a ship. For example, in the case of the control system being installed in an aircraft, the rotating electric machine 30 may serve as a flight power source of the aircraft. Otherwise, in the case of the control system 10 being installed in a ship, the rotating electric machine 30 may serve as a navigation power source of the ship.

The control apparatus and the control method described in the present disclosure may be realized by a dedicated computer that includes a processor, which is programmed to perform one or more functions embodied by a computer program, and a memory. As an alternative, the control apparatus and the control method described in the present disclosure may be realized by a dedicated computer that includes a processor configured with one or more dedicated hardware logic circuits. As another alternative, the control apparatus and the control method described in the present disclosure may be realized by one or more dedicated computers configured with a combination of a processor programmed to perform one or more functions, a memory and a processor configured with one or more dedicated hardware logic circuits. In addition, the computer program may be stored as computer-executable instructions in a computer-readable non-transitory tangible recording medium.

While the present disclosure has been described pursuant to the above-described embodiments, it should be appreciated that the present disclosure is not limited to these embodiments and the structures. Instead, the present disclosure encompasses various modifications and changes within equivalent ranges. In addition, various combinations and modes are also included in the category and the scope of technical idea of the present disclosure.

What is claimed is:

1. A control apparatus to be applied to a system,
   the system comprising:
   a rotating electric machine including a rotor having a permanent magnet and a stator having coils of a plurality of phases; and
   an inverter having, for each of the plurality of phases, an upper-arm switch and a lower-arm switch both of which are electrically connected with the coil of the phase, each of the upper-arm and lower-arm switches having a diode electrically connected in antiparallel thereto, all of the upper-arm switches of the plurality of phases together constituting an upper-arm switch group and all of the lower-arm switches of the plurality of phases together constituting a lower-arm switch group, the control apparatus comprising:
an all-phase short-circuiting unit configured to perform all-phase short-circuit control of turning on all of the switches of one of the upper-arm switch group and the lower-arm switch group and turning off all of the switches of the other of the upper-arm switch group and the lower-arm switch group; and
a single-phase short-circuiting unit configured to perform, in a regenerative drive state where the rotating electric machine functions as an electric generator and prior to execution of the all-phase short-circuit control by the all-phase short-circuiting unit, single-phase short-circuit control of turning on one of the upper-arm and lower-arm switches of one of the plurality of phases, turning off the other of the upper-arm and lower-arm switches of the one of the plurality of phases and turning off all of the upper-arm and lower-arm switches of the remainder of the plurality of phases.

2. The control apparatus as set forth in claim 1, wherein the single-phase short-circuiting unit is configured to:
select the one of the plurality of phases such that among line currents of the plurality of phases flowing between the coils of the rotating electric machine and the switches of the inverter in the regenerative drive state, the line current of the selected phase has a maximum absolute value; and
turn on the one of the upper-arm and lower-arm switches of the selected phase which has no electric current flowing through the diode electrically connected in antiparallel thereto and turn off the other of the upper-arm and lower-arm switches of the selected phase which has electric current flowing through the diode electrically connected in antiparallel thereto.

3. The control apparatus as set forth in claim 1, further comprising a line-to-line voltage acquisition unit configured to acquire line-to-line voltages of the coils of the plurality of phases with an electrical potential on a lower potential side of the lower-arm switches of the plurality of phases being a reference voltage,
wherein
the single-phase short-circuiting unit is configured to perform the single-phase short-circuit control such that:
when one of the line-to-line voltages acquired by the line-to-line voltage acquisition unit is lower than the reference voltage in the regenerative drive state, the single-phase short-circuiting unit selects, of the two phases between which the line-to-line voltage lower than the reference voltage is defined, the phase in which electric current is flowing through the lower-arm diode, and turns on the upper-arm switch of the selected phase and turns off the lower-arm switch of the selected phase; and
when one of the line-to-line voltages acquired by the line-to-line voltage acquisition unit is higher than an input voltage of the inverter, the single-phase short-circuiting unit selects, of the two phases between which the line-to-line voltage higher than the input voltage of the inverter is defined, the phase in which electric current is flowing through the upper-arm diode, and turns on the lower-arm switch of the selected phase and turns off the upper-arm switch of the selected phase.

4. The control apparatus as set forth in claim 1, wherein the all-phase short-circuiting unit is configured to:
count the duration of the single-phase short-circuit control from the start thereof; and
perform the all-phase short-circuit control on condition that the duration has reached a set time.

5. The control apparatus as set forth in claim 4, further comprising:
a d-axis-and-q-axis-currents acquisition unit configured to acquire d-axis and q-axis currents flowing through the coils during execution of the single-phase short-circuit control; and
a time calculation unit configured to calculate the set time based on the d-axis and q-axis currents acquired by the d-axis-and-q-axis-currents acquisition unit.

6. The control apparatus as set forth in claim 1, further comprising:
a d-axis-and-q-axis-currents acquisition unit configured to acquire d-axis and q-axis currents flowing through the coils during execution of the single-phase short-circuit control; and
an execution determination unit configured to determine, based on the d-axis and q-axis currents acquired by the d-axis-and-q-axis-currents acquisition unit, whether a magnitude of d-axis current which will flow through the coils if the all-phase short-circuit control is performed is within a range in which no demagnetization of the permanent magnet occurs,
wherein
the all-phase short-circuiting unit is configured to perform the all-phase short-circuit control on condition that it is determined by the execution determination unit that the magnitude of the d-axis current which will flow through the coils if the all-phase short-circuit control is performed is within the range in which no demagnetization of the permanent magnet occurs.

7. The control apparatus as set forth in claim 1, further comprising:
a q-axis-current acquisition unit configured to acquire q-axis current flowing through the coils; and
an execution determination unit configured to determine whether the q-axis current acquired by the q-axis-current acquisition unit during execution of the single-phase short-circuit control has been reduced to become lower than the q-axis current prior to the execution of the single-phase short-circuit control,
wherein
the all-phase short-circuiting unit is configured to perform the all-phase short-circuit control on condition that it is determined by the execution determination unit that the q-axis current during the execution of the single-phase short-circuit control has been reduced to become lower than the q-axis current prior to the execution of the single-phase short-circuit control.

8. The control apparatus as set forth in claim 1, further comprising a demagnetization determination unit configured to determine whether demagnetization of the permanent magnet will occur if the all-phase short-circuit control is performed,
wherein
the single-phase short-circuiting unit is configured to perform the single-phase short-circuit control on condition that it is determined by the demagnetization determination unit that demagnetization of the permanent magnet will occur if the all-phase short-circuit control is performed.

9. The control apparatus as set forth in claim 1, wherein:
the system further comprises a power storage unit electrically connected with the coils of the rotating electric machine via the inverter;
the control apparatus further comprises an overvoltage determination unit configured to determine whether an overvoltage abnormality has occurred in the power storage unit; and
the all-phase short-circuiting unit is configured to perform the all-phase short-circuit control on condition that it is determined by the overvoltage determination unit that the overvoltage abnormality has occurred in the power storage unit.

10. The control apparatus as set forth in claim 1, further comprising:
a drive state acquisition unit configured to acquire a drive state of the rotating electric machine; and
a drive determination unit configured to determine, based on the drive state acquired by the drive state acquisition unit, whether the rotating electric machine is in a power running drive state where it functions as an electric motor or in the regenerative drive state where it functions as an electric generator,
wherein
the single-phase short-circuiting unit is configured to perform the single-phase short-circuit control on condition that it is determined by the drive determination unit that the rotating electric machine is in the regenerative drive state.

11. The control apparatus as set forth in claim 10, wherein the all-phase short-circuiting unit is configured to temporarily perform, when it is determined by the drive determination unit that the rotating electric machine is in the power running drive state, shutdown control prior to performing the all-phase short-circuit control, the shutdown control being a control of turning off all of the upper-arm and lower-arm switches of the plurality of phases.

12. The control apparatus as set forth in claim 1, wherein the single-phase short-circuiting unit is configured to temporarily perform shutdown control prior to performing the single-phase short-circuit control, the shutdown control being a control of turning off all of the upper-arm and lower-arm switches of the plurality of phases.

* * * * *